United States Patent
Kaeriyama et al.

(10) Patent No.: US 9,016,829 B2
(45) Date of Patent: Apr. 28, 2015

(54) INK COMPOSITION, INK SET, AND IMAGE FORMING METHOD

(75) Inventors: Atsushi Kaeriyama, Kanagawa (JP); Toshihiro Kamada, Kanagawa (JP); Kiyoshi Irita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 482 days.

(21) Appl. No.: 13/571,345

(22) Filed: Aug. 10, 2012

(65) Prior Publication Data
US 2013/0050331 A1 Feb. 28, 2013

(30) Foreign Application Priority Data

Aug. 24, 2011 (JP) ................... 2011-183093

(51) Int. Cl.
| | |
|---|---|
| B41J 2/015 | (2006.01) |
| C09D 11/10 | (2014.01) |
| C08K 5/23 | (2006.01) |
| C09D 135/00 | (2006.01) |
| C09D 11/101 | (2014.01) |
| C09D 11/322 | (2014.01) |
| C09D 11/40 | (2014.01) |
| C09D 11/54 | (2014.01) |

(52) U.S. Cl.
CPC ............ *C09D 11/101* (2013.01); *C09D 11/322* (2013.01); *C09D 11/40* (2013.01); *C09D 11/54* (2013.01)

(58) Field of Classification Search
USPC .......................................... 524/555, 460, 190
See application file for complete search history.

(56) References Cited

U.S. PATENT DOCUMENTS

| | | |
|---|---|---|
| 2005/0288384 A1 | 12/2005 | Kanke et al. |
| 2010/0075052 A1* | 3/2010 | Irita .............................. 427/288 |

FOREIGN PATENT DOCUMENTS

| | | |
|---|---|---|
| JP | 3576862 B | 10/2004 |
| JP | 2004-323753 | 11/2004 |
| JP | 3642152 B | 4/2005 |
| JP | 2005-307198 | 11/2005 |
| JP | 2007-154087 | 6/2007 |
| JP | 2010-070693 | 4/2010 |

OTHER PUBLICATIONS

Machine translation of JP 2007-154087A.*

(Continued)

*Primary Examiner* — Vu A Nguyen
(74) *Attorney, Agent, or Firm* — Solaris Intellectual Property Group, PLLC

(57) ABSTRACT

Disclosed is an ink composition including: (1) a pigment; (2) a polymerization initiator having a content of 2% by mass or more with respect to a total amount of the composition and having a solubility with respect to pure water at 25° C. of 5 to 8 g/l; (3) a compound A that is at least one selected from the group consisting of dimethylacrylamide, diethylacrylamide, N-isopropylacrylamide, dimethylacetamide, N-ethylpyrrolidone, 1-cyclohexyl-2-pyrrolidone, 1-(2-hydroxyethyl)-2-pyrrolidone, 1,3-dimethyl-2-imidazolidinone, tetramethylurea and gamma-valerolactone; (4) a polymerizable compound having two or more ethylenically unsaturated double bonds; and (5) water having a content of 50% by mass or more with respect to the total amount of the composition.

20 Claims, 1 Drawing Sheet

(56) References Cited

OTHER PUBLICATIONS

English language translation of the following: Office action dated Aug. 27, 2013 from the JPO in a Japanese patent application corresponding to the instant patent application. This office action translation is submitted now in order to supplement the understanding of patent document JP2004-323753, JP2007-154087, JP2005-307198 and JP2010-070693 which are cited in the office action and are being disclosed in the instant Information Disclosure Statement.

* cited by examiner

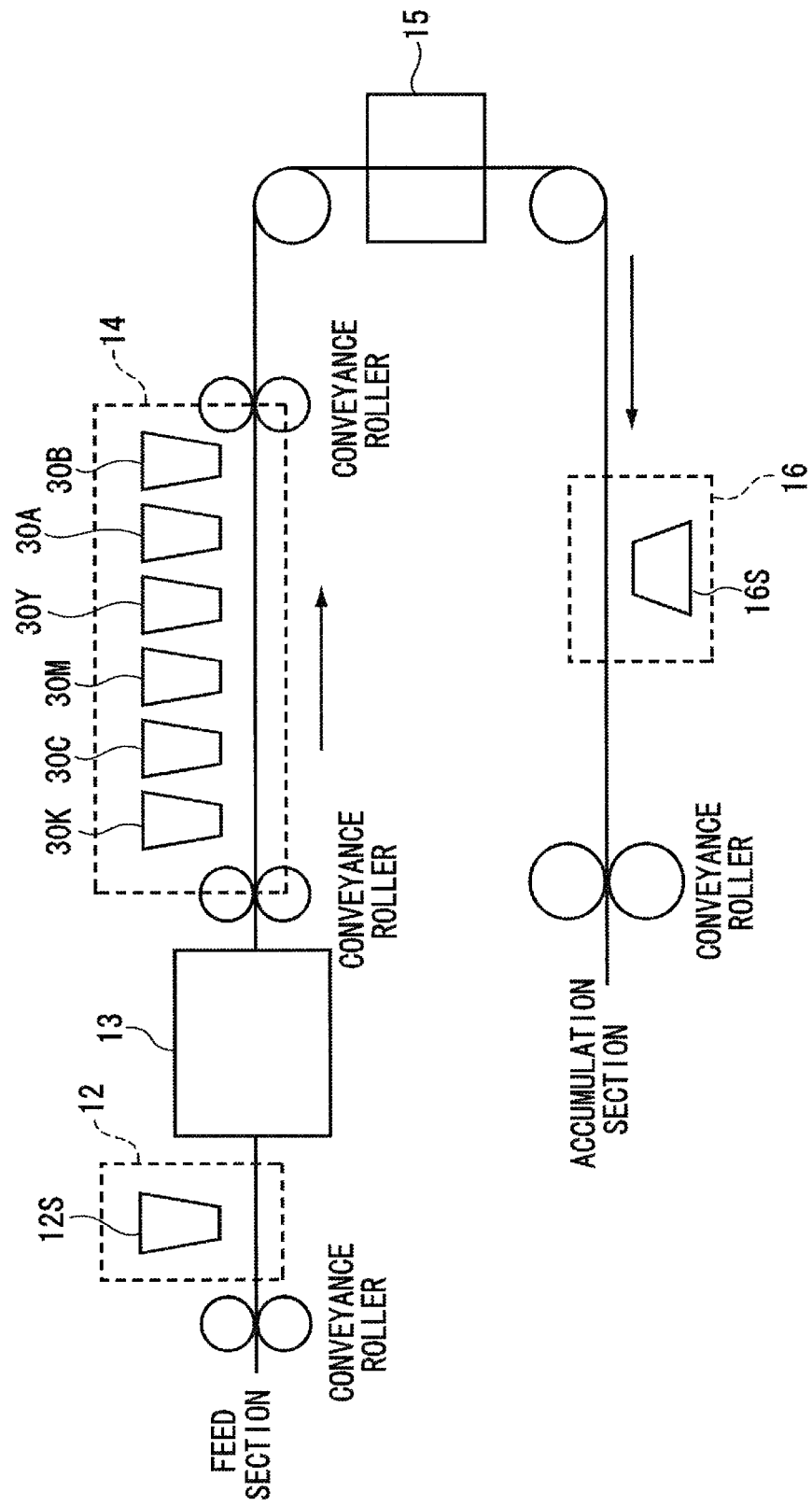

INK COMPOSITION, INK SET, AND IMAGE FORMING METHOD

CROSS-REFERENCE TO RELATED APPLICATION

This application claims priority under 35 USC 119 from Japanese Patent Application No. 2011-183093, filed on Aug. 24, 2011, the disclosure of which is incorporated by reference herein.

BACKGROUND OF THE INVENTION

1. Field of the Invention

The present invention relates to an ink composition, an ink set, and an image forming method.

2. Description of the Related Art

Ink jet techniques allow intended image formation on a variety of recording media, and therefore are an image recording method widely promising in the field of office and home printers, as well as in the commercial field.

As ink used for ink jet recording, besides solvent-based ink, water-based ink is drawing attention from a viewpoint of considering global environment and work environment. Particularly, a technique for forming images exhibiting high rub fastness, such as resistant to scratches by curing a water-based pigment ink composition containing a polymerizable monomer component has been under investigation.

As one of such techniques for forming images, for example, an inkjet recording method has been disclosed (see, for example, Japanese Patent No. 3,642,152) in which printing is performed on a recording medium by depositing an ink composition containing an acrylate monomer and/or a resin emulsion and a reaction liquid containing a photopolymerization initiator and a reactive agent that produces aggregate in contact with the ink composition. Further, an ink of one-component type used for inkjet recording has been disclosed (see, for example, Japanese Patent No. 3,576,862) which includes a specific cationic oligomer and a photopolymerization initiator, together with a colorant and water.

Meanwhile, there are a variety of compounds currently known as initiators initiating the polymerization of polymerizable monomers. Those compounds can be appropriately selected based on needs and purposes. However, there are cases where solubility of the initiator in water-based solvents cannot necessarily be satisfactory.

The conventional techniques use a photopolymerization initiator in water-based pigment ink, in which, however, no consideration is given to the initiator solubility. Thus, when satisfactory initiator solubility is not obtained, ink stability is deteriorated and also images cannot have sufficient rub fastness. In addition, when image surfaces are in contact with each other over time, the images may partially adhere to each other and may not be able to be separated. When the ink is aged under a low temperature condition, this becomes conspicuous. Such ink is also not suitable for high-speed recording.

Furthermore, the method described in Patent Literature 1, which is a technique for immobilizing ink by reaction of a reaction solution with an ink, is also insufficient in terms of immobilization of images.

The present invention has been accomplished in view of the above circumstances. It is an object of the present invention to provide both an ink composition and an ink set that exhibit high temporal stability under various temperature conditions including a low temperature and allow to form images with favorable rub fastness, and to provide an image forming method for forming images with high rub fastness.

SUMMARY OF THE INVENTION

According to the present invention, for example, the following aspects of the invention are provided.

<1> An ink composition comprising (1) a pigment; (2) a polymerization initiator having a content of 2% by mass or more with respect to a total amount of the composition and having a solubility with respect to pure water at 25° C. of 5 to 8 g/l; (3) a compound A that is at least one selected from the group consisting of dimethylacrylamide, diethylacrylamide, N-isopropylacrylamide, dimethylacetamide, N-ethylpyrrolidone, 1-cyclohexyl-2-pyrrolidone, 1-(2-hydroxyethyl)-2-pyrrolidone, 1,3-dimethyl-2-imidazolidinone, tetramethylurea and gamma-valerolactone; (4) a polymerizable compound having two or more ethylenically unsaturated double bonds; and (5) water having a content of 50% by mass or more with respect to the total amount of the composition.

<2> The ink composition according to the above item <1>, wherein the polymerizable compound is a compound having two or more (meth)acrylamide groups.

<3> The ink composition according to the above item <1> or <2>, wherein (3) the compound A is at least one selected from the group consisting of dimethylacrylamide, N-isopropylacrylamide, dimethylacetamide, N-ethylpyrrolidone and 1-cyclohexyl-2-pyrrolidone.

<4> The ink composition according to any one of the above items <1> to <3>, wherein the polymerizable compound is represented by the following Formula (1):

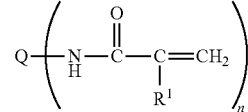

Formula (1)

wherein, in Formula (1), Q represents a linking group having a valence of n; $R^1$ represents a hydrogen atom or a methyl group; and n represents an integer of 2 or more.

<5> The ink composition according to any one of the above items <1> to <4>, wherein the content of compound A is from 0.5 to 40% by mass with respect to the total amount of the composition.

<6> The ink composition according to any one of the above items <1> to <5>, wherein the pigment is a water-dispersible pigment whose surface is at least partially coated with a polymeric dispersant.

<7> The ink composition according to any one of the above items <1> to <6>, wherein the pigment is a water-dispersible pigment whose surface is at least partially coated with a polymeric dispersant having a carboxyl group.

<8> The ink composition according to any one of the above items <1> to <7>, wherein the pigment comprises an azo pigment.

<9> The ink composition according to any one of the above items <1> to <8>, wherein the content of the compound A is from 5 to 20% by mass with respect to the total amount of the composition.

<10> The ink composition according to any one of the above items <1> to <9>, wherein the polymerization initiator has a content of from 2% by mass to 4% by mass with respect to the total amount of the composition.

<11> The ink composition according to any one of the above items <1> to <10>, wherein the polymerization initiator comprises a hydroxyalkylphenone-based initiator.
<12> The ink composition according to any one of the above item <4>, wherein, in Formula (1), Q represents a polyol residue including three or more oxyalkylene groups and n represents an integer from 2 to 6.
<13> An ink set including the ink composition according to any one of the above items <1> to <12> and a treatment liquid containing an aggregation component that forms an aggregate when in contact with the ink composition.
<14> An image forming method comprising an ink applying step that applies the ink composition according to any one of the above items <1> to <12>, to a recording medium by ink jetting, to form an image.
<15> The image forming method according to the above item <14>, further comprising a treatment liquid applying step that applies, to the recoding medium, a treatment liquid containing a aggregation component that forms an aggregate when in contact with the ink composition.

According to the present invention, there are provided both an ink composition and an ink set exhibiting high temporal stability under various temperature conditions including a low temperature and allowing to form images with favorable rub fastness.

In addition, according to the invention, there is provided an image forming method that forms images with high rub fastness.

BRIEF DESCRIPTION OF THE DRAWINGS

FIG. 1 is a schematic configuration diagram showing an example of the structure of an ink jet recording device used for carrying out an image forming method.

DETAILED DESCRIPTION OF THE INVENTION

Hereinafter, an ink composition according to the present invention, and both an ink set and an image forming method using the same are described in detail.

Ink Composition

The ink composition of the present invention includes components of (1) a pigment; (2) a polymerization initiator having a content of 2% by mass or more and preferably 4% by mass or less with a total amount of the composition and having a solubility with respect to pure water at 25° C. of 5 to 8 g/l; (3) a compound A that is at least one selected from the group consisting of dimethylacrylamide, diethylacrylamide, N-isopropylacrylamide, dimethylacetamide, N-ethylpyrrolidone, 1-cyclohexyl-2-pyrrolidone, 1-(2-hydroxyethyl)-2-pyrrolidone, 1,3-dimethyl-2-imidazolidinone, tetramethylurea and gamma-valerolactone (hereinafter, the compound A may be referred to as "the specific compound"); (4) a polymerizable compound having two or more ethylenically unsaturated double bonds; and (5) water having a content of 50% by mass or more with respect to the total amount of the composition.

The ink composition of the present invention may further include, as necessary, other components such as polymer particles, a surfactant, an aqueous organic solvent, or a wetting agent.

In image forming techniques using UV curing, conventional systems using solvent-based ink are widely known. However, from a viewpoint of environment and workability, water-based ink has been becoming a mainstream in recent years. In the preparation of water-based ink, there are cases in which solubility of a polymerization initiator used for polymerization reaction of a polymerizable monomer or the like cannot be sufficiently maintained. As a result, both stability of ink and strength of formed images are apt to be easily deteriorated. Deterioration of both ink stability and rub fastness of image becomes noticeable particularly when the ink is exposed to a low temperature condition.

To address the above problems, according to the present invention, in the case of preparing a curable ink composition using a polymerization initiator having a relatively low solubility with respective to water (a solubility of 5 to 8 g/l with respective to pure water at 25° C.), the solubility of the polymerization initiator in water is maintained by combining a specific compound with the polymerization initiator, regardless of temperature conditions in the time of storage or use. Furthermore, the ink composition of the invention includes a bifunctional polymerizable compound. Therefore, as compared to conventional ink compositions, the temporal stability of the ink composition is further improved, and formed images exhibit higher rub fastness.

Hereinafter, each of the components in the ink composition of the present invention is described in detail.

(1) Pigment

The ink composition of the present invention includes at least one pigment as a coloring agent. The pigment, unlike a dye that is used by dissolving it into water, an organic solvent, or the like in a molecular dispersion state, is used by minutely dispersing as solid particles such as a molecular aggregate in a solvent.

The pigment is not specifically restricted and can be appropriately selected according to the purpose. For example, the pigment may be either organic or inorganic. Preferably, the pigment is scarcely soluble or hardly soluble in water from a viewpoint of ink colorability.

Examples of organic pigments include azo pigments, multicyclic pigments, dye chelates, nitro pigments, nitroso pigments, and aniline black. Among them, azo pigments, multicyclic pigments, and the like are more preferred.

Furthermore, as the azo pigments, a pigment represented by the following Formula (2) and a tautomer thereof are favorable.

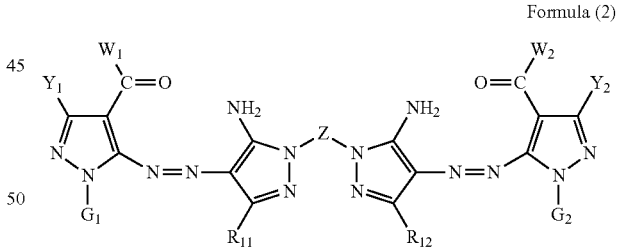

Formula (2)

wherein, in Formula (2), Z represents a divalent group derived from a 5- to 8-membered nitrogen-containing hetero ring; each of $Y_1$, $Y_2$, $R_{11}$ and $R_{12}$ independently represents a hydrogen atom or a substituent; each of $G_1$ and $G_2$ independently represents a hydrogen atom, an alkyl group, an cycloalkyl group, an aralkyl group, an alkenyl group, an alkynyl group, an aryl group, or a heterocyclic group; each of $W_1$ and $W_2$ independently represents an alkoxy group, an amino group, an alkyl group, or an aryl group.

The compound represented by Formula (2) easily forms an intermolecular interaction due to its specific structure and has low solubility with respect to water, organic solvents, or the like. The compound is also used by minutely dispersing as solid particles such as a molecular aggregate in a solvent. The azo pigment also encompasses a tautomer of the azo pigment represented by Formula (2). Accordingly, while Formula (2) shows one extreme structural formula among those of some types of tautomers, which are possible chemical structures, the tautomer of the azo pigment to be used may be one other than that having the structure shown by Formula (2) or may be a mixture containing a plurality of tautomers.

Details of the pigment represented by Formula (2) and a tautomer thereof can be explained by reference to the descriptions of paragraph Nos. [0019] to [0070] in JP-A No. 2011-052105, in which preferable embodiments of the present invention regarding the azo pigment are also the same as those described in the above publication.

Examples of the inorganic pigment include titanium oxide, iron oxide, calcium carbonate, barium sulfate, aluminium hydroxide, barium yellow, cadmium red, chrome yellow, and carbon black. Among them, carbon black is particularly preferable.

The small average particle diameter of the organic pigment is better from a viewpoint of transparency and color reproducibility, but the large average particle diameter is better from a viewpoint of light resistance. To make a balance between them, the average particle diameter thereof is preferably 10 to 200 nm, more preferably 10 to 150 nm, and still more preferably 10 to 120 nm. The particle size distribution of the organic pigment is not specifically restricted, and the organic pigment may have either a large particle size distribution or a mono-disperse particle size distribution. Alternatively, a mixture of two or more organic pigments having a mono-disperse particle size distribution may be used.

The content of the pigments is preferably 1 to 25% by mass, more preferably 2 to 20% by mass, still more preferably 5 to 20% by mass, and particularly preferably 5 to 15% by mass relative to the total mass of the ink composition.

Dispersing Agent

The ink composition of the present invention may contain at least one dispersing agent for dispersing a dye. As the dispersing agent for the pigment, any of polymer dispersing agents or low molecular surfactant type dispersing agents may be acceptable. The polymer dispersing agents may be water-soluble dispersing agents or water-insoluble dispersing agents.

The low molecular surfactant type dispersing agents can make the pigment disperse stably in a water solvent while maintaining the ink at a low viscosity. The low molecular surfactant type dispersing agents are low molecular dispersing agents having a molecular weight of 2,000 or lower. The molecular weight of the low molecular surfactant type dispersing agents is preferably 100 to 2,000 and more preferably 200 to 2,000.

The low molecular surfactant type dispersing agents have a structure containing a hydrophilic group and a hydrophobic group. One or more hydrophilic groups and one or more hydrophobic groups may each independently be contained in the molecule of the dispersing agent and plural kinds of hydrophilic groups or hydrophobic groups may be contained in the molecule. A linking group for connecting the hydrophilic group and the hydrophobic group may be contained as appropriate.

Examples of the hydrophilic group include an anionic group, a cationic group, a nonionic group, or a betaine type group in which these groups are combined. Any suitable anionic group may be used insofar as the anionic group has a negative charge. The anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group and a carboxylic acid group, and still more preferably a carboxylic acid group. Any suitable cationic group may be used insofar as the cationic group has a positive charge and is preferably an organic cationic substituent and more preferably a cationic group of nitrogen or phosphorus. The cationic group is still more preferably pyridinium cation or ammonium cation. Examples of the nonionic group include polyethylene oxide, polyglycerin, and a part of sugar units.

The hydrophilic group is preferably an anionic group.

When the low-molecular surfactant-type dispersant has an anionic hydrophilic group, the dispersant preferably has a pKa of 3 or more, from the viewpoint of promoting coagulation reaction in contact with an acidic treatment liquid. The pKa mentioned here is an experimentally-obtained value based on a titration curve which is obtained by titrating a 1 mmol/L solution of a low-molecular surfactant-type dispersant in tetrahydrofuran/water at a ratio of 3:2 (THF:water, V/V), with an acid or alkali aqueous solution. When the pKa of the low-molecular surfactant-type dispersant is 3 or more, 50% or more of the anionic groups theoretically become undissociated when in contact with a liquid having a pH of around 3. Accordingly, the water-solubility of the low-molecular surfactant-type dispersant is significantly reduced, as a result of which a coagulation reaction occurs, namely, the coagulation reactivity is improved. From this point of view, the low-molecular surfactant-type dispersant preferably has a carboxyl group as an anionic group.

The hydrophobic group has, for example, a hydrocarbon structure, a fluorocarbon structure, or a silicone structure, and the hydrocarbon structure is preferable. The hydrophobic group may have either a straight-chain structure or a branched structure. Further, the hydrophobic group may have a single-chain structure or multi-chain structure. When there are two or more chains, the chains may include two or more kinds of hydrophobic group. The hydrophobic group is preferably a hydrocarbon group having a carbon number of from 2 to 24, more preferably from 4 to 24, and yet more preferably from 6 to 20.

When the polymeric dispersant is a water-soluble dispersant, examples thereof include a hydrophilic polymeric dispersant. Examples of natural hydrophilic polymeric compounds include plant polymers such as gum arabic, gum tragacanth, guar gum, gum karaya, locust bean gum, arabinogalactan, pectin and quince seed starch; marine alga polymers such as alginic acid, carrageenan and agar; animal polymers such as gelatin, casein, albumin and collagen; and microbial polymers such as xanthene gum and dextran.

Examples of hydrophilic polymeric compounds obtained by modifying natural raw materials include fibrous polymers such as methyl cellulose, ethyl cellulose, hydroxyethyl cellulose, hydroxypropyl cellulose and carboxymethyl cellulose, starch polymers such as sodium starch glycolate (sodium salt of starch glycolate), and sodium starch phosphate (sodium salt of starch phosphate [ester]), and algae polymers such as sodium alginate and propylene glycol alginate.

Examples of synthetic hydrophilic polymeric compounds include vinyl polymers such as polyvinyl alcohol, polyvinyl pyrrolidone and polyvinyl methyl ether; acrylic resins such as non-crosslinked polyacrylamide, polyacrylic acid or an alkali metal salt thereof, and water-soluble styrene acrylic resins; water-soluble styrene maleic acid resin; water-soluble vinylnaphthalene acrylic resin; water-soluble vinylnaphthalene maleic acid resins; alkali metal salts of formalin condensates of β-naphthalene sulfonic acid; polymeric compounds having, at a side chain, a salt of a cationic functional group such as a quaternary ammonium group or an amino group; and natural polymeric compounds such as shellac.

Among these, water-soluble dispersants to which a carboxyl group is introduced are preferable, and examples thereof include homopolymers of acrylic acid, methacrylic acid or styrene acrylic acid, and copolymers thereof with another monomer having a hydrophilic group.

When the polymeric dispersant is a water-insoluble dispersant, a polymer having both a hydrophilic moiety and a hydrophobic moiety can be used. Examples of the water-insoluble dispersants include styrene-(meth)acrylic acid copolymer, styrene-(meth)acrylic acid-(meth)acrylate copolymer, (meth)acrylate-(meth)acrylic acid copolymer, polyethylene glycol(meth)acrylate-(meth)acrylic acid copolymer, vinylacetate-maleic acid copolymer, and styrene-maleic acid copolymer.

The weight average molecular weight of the polymer dispersant is preferably from 3,000 to 100,000, more preferably from 5,000 to 50,000, still more preferably from 5,000 to 40,000, and still more preferably from 10,000 to 40,000.

The polymeric dispersant preferably includes a polymer having a carboxyl group from a viewpoint of self-dispersibility and aggregation rate upon contact with a treatment liquid. The polymeric dispersant preferably includes a polymer having a carboxyl group and having an acid value of 100 mgKOH/g or less, and more preferably includes a polymer having an acid value of 25 to 100 mgKOH/g. Particularly, when using the ink composition of the present invention in combination with a treatment liquid (whose details will be described later) that will cause component aggregation in the ink composition, the polymeric dispersant having a carboxyl group and having an acid value of 25 to 100 mgKOH/g is effective.

The mixing ratio by mass of pigment (p) to dispersant (s) (p:s) is preferably in a range of from 1:0.06 to 1:3, more preferably in a range of from 1:0.125 to 1:2, and still more preferably in a range of from 1:0.125 to 1:1.5.

In the present invention, when a dye is used as a colorant in place of pigment, a dye retained on a water-insoluble carrier may be used as a water-insoluble colorant particle. The dye may be selected from known dyes without particular restrictions, and the dyes described in, for example, JP-A Nos. 2001-115066, 2001-335714, and 2002-249677 may be used suitably in the present invention. The carrier is not particularly limited as long as the carrier is insoluble in water or hardly-soluble in water, and the carrier may be selected from an inorganic material, an organic material, or a composite material thereof. Specifically, the carriers described in, for example, JP-A Nos. 2001-181549 and 2007-169418 may be used suitably in the present invention.

The carrier that retains the dye (water-insoluble colorant particle) may be used in the form of an aqueous dispersion containing a dispersant. As the dispersant, the above-mentioned dispersants may be used suitably.

In the present invention, the ink composition preferably includes a pigment and a dispersant, more preferably includes an organic pigment and a polymer dispersant, and particularly preferably includes an organic pigment and a polymer dispersant containing carboxyl group, in consideration of the light-fastness, quality, and the like of the image. From the viewpoint of coagulation properties, it is preferable that the pigment is covered with a polymer dispersant having a carboxyl group and is water-insoluble.

The average particle diameter of the pigment in the dispersion state is preferably from 10 nm to 200 nm, more preferably from 10 nm to 150 nm, and still more preferably from 10 nm to 100 nm. When the average particle diameter is 200 nm or less, color reproducibility is excellent, and jetting properties are excellent when jetting droplets by an inkjet method. When the average particle diameter is 10 nm or more, excellent light-fastness is achieved. The particle size distribution of the colorant is not particularly limited, and may be a broad particle size distribution or a monodisperse particle size distribution. It is also possible to use a mixture of two or more colorants having monodisperse particle size distributions.

Herein, the average particle diameter of the pigment in the dispersion state means an average particle diameter of the pigment in the state of an ink in which the pigment is dispersed. The same applies to a so-called concentrated ink which is a previous phase of the ink.

The average particle diameter of the pigment in the dispersion state and the average particle diameter and the particle size distribution of the polymer particles are obtained by measuring volume average particle diameter in accordance with a dynamic light scattering method, using a Nanotrac particle size distribution measuring instrument UPA-EX150 (trade name, manufactured by NIKKISO Co., Ltd.).

The pigment may be used singly or in combination of two or more thereof. From the viewpoint of image density, the content of pigment in the ink composition is preferably from 1 to 25% by mass, more preferably from 2 to 20% by mass, still more preferably from 5 to 20% by mass, and particularly preferably from 5 to 15% by mass, with respect to the ink composition.

(2) Polymerization Initiator

The ink composition of the present invention includes at least one polymerization initiator (hereinafter may be referred to as "a polymerization initiator in the present invention") having a solubility of from 5 to 8 g/l with respect to pure water at 25° C. Solubility in water of the polymerization initiator having the above-described solubility can be maintained by using a specific compound that will be described later, so that precipitation or the like of the polymerization initiator is prohibited in aqueous ink. Accordingly, when an ink composition is prepared using the polymerization initiator, temporal stability (particularly stability in a low-temperature range) thereof is improved. In addition, rub fastness of images is also improved.

The expression "solubility of from 5 to 8 g/l" means that, although the compound is soluble in pure water, its solubility is low. When the solubility is in that range, the effects of the present invention can be achieved more favorably.

In the present invention, the content of the polymerization initiator in the ink composition is 2% by mass or more with respect to the total amount of the ink composition. The content of the polymerization initiator in the present invention that is 2% by mass or more indicates that the amount of the polymerization initiator is such a range that the polymerization initiator easily causes precipitation in the ink. This enhances effects due to incorporation of a specific compound described later.

Within the above range, the content of the polymerization initiator is in a range of preferably from 2 to 4% by mass, more preferably from 2 to 3.5% by mass, and still more preferably from 2 to 3% by mass. By controlling the content of the polymerization initiator in the present invention to 4% by mass or less, stability-enhancing effects due to incorporation of the specific compound described later can be more expected.

The polymerization initiator having solubility of from 5 to 8 g/l used in the present invention is not specifically restricted by factors other than solubility from the viewpoint of the effect, and can be appropriately selected from known compounds. Basically, the polymerization initiator may be appropriately selected from compounds that can initiate polymerization reaction by actinic energy ray. For example, it is possible to use an initiator (such as a photopolymerization initiator) that generates active species (such as radical, acid, or base) by radiation, light, or an electron beam.

Examples of the polymerization initiator in the present invention include hydroxy alkylphenone-based initiators, acetophenone-based initiators, benzophenone-based initiators, benzoin- or benzoinether-based initiators, aminoalkylphenone-based initiators, xanthone-based initiators, and oxime-based initiators.

Examples of the hydroxy alkylphenone-based initiators include 1-hydroxycyclohexyl phenyl ketone, 1-[4-(2-hydroxyethoxy)-phenyl]-2-hydroxy-2-methyl-1-propane-1-one, 2-hydroxy-2-methyl-1-phenyl-1-one, and 1-(4-isopropylphenyl)-2-hydroxy-2-methylpropan-1-one. In addition, examples of commercially available hydroxy alkylphenone-based initiators on the market include IRGACURE 2959 (trade name, manufactured by BASF Japan, Co., Ltd).

Examples of the acetophenone-based initiators include acetophenone, 2,2-diethoxyacetophenone, and p-dimethylaminoacetophenone.

Examples of the benzophenone-based initiators include benzophenone, 2-chlorobenzophenone, p,p'-dichlorobenzophenone, p,p'-bisdiethyl aminobenzophenone, and Michler ketone.

Examples of the benzoin- or benzoinether-based initiators include benzoin, benzoinmethylether, benzomethylether, benzoinisopropylether, benzoin n-propyl ether, benzoinisobutylether, and benzoin n-butyl ether.

The polymerization initiator in the present invention may be used alone or in combination of two or more of thereof. Further, another polymerization initiator may be used in addition to the polymerization initiator having solubility of from 5 to 8 g/lm used in the present invention.

A total amount of the polymerization initiator contained in the ink composition is preferably from 1 to 40% by mass, and more preferably from 5 to 30% by mass, with respect to the amount of a polymerizable compound (including dimethyl acrylamide, N-isopropylacrylamide, and diethylacrylamide that will be described later). When the content of polymerization initiator is 1% by mass or more, rub fastness of images is further improved, which is advantageous in high-speed recording. Meanwhile, when the content thereof is 40% by mass or less, advantage is obtained in terms of ejection stability.

The polymerization initiator may be used together with a sensitizer. Examples of the sensitizer include amines (such as aliphatic amines, aromatic amines, and piperidine), ureas (such as allyl urea and o-tolyl thiourea), sulfur compounds (such as sodium diethyl dithiophosphate and soluble salts of aromatic sulfinic acid), nitrile compounds (such as N,N-disubstituted-p-aminobenzonitrile), phosphorous compounds (such as tri-n-butylphosphine and sodium diethyl dithiophosphide), nitrogen compounds (such as Michler ketone, N-nitrisohydroxylamine derivatives, oxazolidine compounds, tetrahydro-1,3-oxazine compounds, and condensates of formaldehyde or acetaldehyde and diamine), chlorine compounds (such as carbon tetrachloride and hexachloroethane), polymeric amines as the reaction products of an epoxy resin and an amine, and triethanolamine triacrylate.

The sensitizer can be included in a range that does not undermine the effectiveness of the present invention.

(3) Compound Selected from Specific Compound Group

The ink composition of the present invention includes, together with the polymerization initiator in the present invention, a compound A that is at least one selected from "compound group A" which consists of dimethylacrylamide, diethylacrylamide, N-isopropylacrylamide, dimethylacetamide, N-ethylpyrrolidone, 1-cyclohexyl-2-pyrrolidone, 1-(2-hydroxyethyl)-2-pyrrolidone, 1,3-dimethyl-2-imidazolidinone, tetramethylurea, and gamma-valerolactone. Compound A may be used alone as one selected from compound group A or in combination of two or more selected therefrom.

By incorporating a specific compound selected from the compound group A in the ink composition, temporal stability of the ink composition, in the case where the polymerization initiator in the present invention is used, can be favorably maintained, thereby further enhancing rub fastness of formed images.

From a viewpoint of solubility-enhancing effect of the polymerization initiator in the present invention, among the compounds of the compound group A, preferred are dimethylacrylamide, N-isopropylacrylamide, dimethylacetamide, N-ethylpyrrolidone, and 1-cyclohexyl-2-pyrrolidone. These compounds may be used alone or in combination of two or more thereof.

In addition, when the ink composition includes a compound selected from dimethylacrylamide, N-isopropyl acrylamide, and diethyl acrylamide of the compound group A, since each of these compounds has a polymerizable group, these compounds can contribute to polymerization and curing in the time of image formation, thereby enhancing rub fastness of the images.

The content of the specific compound in the ink composition is preferably 0.5 to 40% by mass, more preferably 1 to 35% by mass, still more preferably 5 to 30% by mass, particularly preferably 5 to 25% by mass, and most preferably 5 to 20% by mass, with respect to the total amount of the ink composition.

By setting the content of the specific compound to 0.5% by mass or more, precipitation of the polymerization initiator in the present invention can be suppressed and thereby temporal stability of the ink composition is increased and image strength can be enhanced at the same time. Meanwhile, by setting the content of the specific compound to 40% by mass or less, ink viscosity can be reduced to a low level and ejectability is maintained, whereby more favorable image quality can be obtained.

(4) Polymerizable Compound

The ink composition of the present invention includes at least one polymerizable compound (hereinafter may be simply referred to as "a polymerizable compound") having two or more ethylenically unsaturated double bonds. When only a monofunctional polymerizable compound is used, it is difficult to obtain curability, which is likely to create problems in high-speed recording or the like. In contrast, rub fastness of images obtained by curing is improved particularly by incorporation of a bifunctional or higher functional polymerizable compound in the present invention.

The polymerizable compound in the present invention is a water-soluble polymerizable compound having a polymerizable group and polymerized by action of the polymerization initiator when actinic energy ray is applied. The polymerizable compound is used in combination with the above-described pigment and, if needed, polymer particles that will be described later. When the polymerizable compound is aggregated in contact with a treatment liquid, the polymerizable compound becomes incorporated between particles and strengthens images by subsequent polymerization and curing.

The term "water-soluble" refers to a property in which a substance is dissolved in water to a predetermined density level or higher. Any polymerizable monomer may be used, so long as it is soluble (preferably homogeneously) in an aque- Hereinafter, specific examples (nonionic compounds 1 to 6) of nonionic polymerizable compounds will be shown. However, the nonionic polymerizable compounds in the present invention are not restricted to them.

Nonionic Compound 1

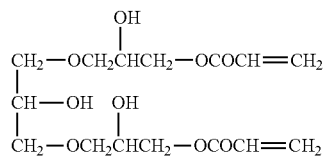

Nonionic Compound 2

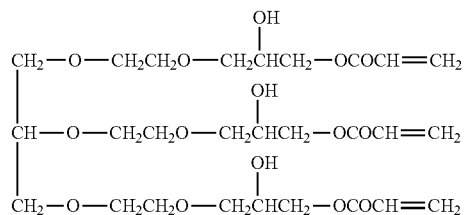

Nonionic Compound 3

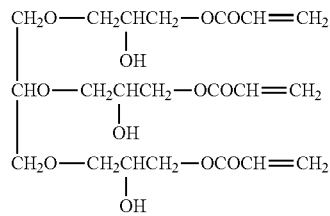

Nonionic Compound 4

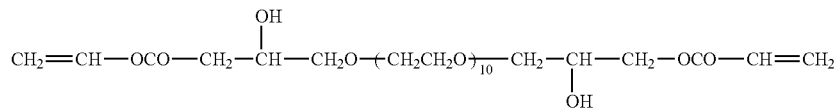

Nonionic Compound 5

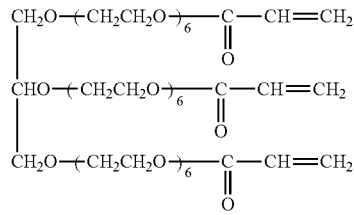

Nonionic Compound 6

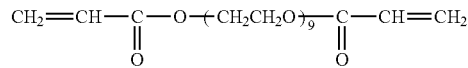

ous ink or a treatment liquid. In addition, it is possible to a polymerizable monomer which becomes (preferably homogeneously) soluble in an ink by adding thereto a water-soluble organic solvent described below so that solubility can be increased. Specifically, solubility of the ink composition in water (25° C.) is preferably 10% by mass or higher and more preferably 15% by mass or higher.

A nonionic polymerizable monomer is preferably used as the polymerizable monomer, from the viewpoint of less interference of reactions between an aggregating agent and pigment or polymer particles, and it is preferable for a polymerizable monomer to have solubility in water of 10% by mass or higher and more preferably 15% by mass or higher.

Examples of the nonionic polymerizable monomer include polymerizable monomers such as (meth)acrylic monomers.

Examples of the (meth)acrylic monomer include UV curable monomers and oligomers such as (meth)acrylic acid ester of polyhydric alcohol, (meth)acrylic acid ester of glycidyl ether of polyhydric alcohol, (meth)acrylic acid ester of polyethylene glycol, (meth)acrylic acid ester of ethylene oxide adduct compounds of polyhydric alcohol, and reaction products of polybasic acid anhydride and hydroxyl group-containing (meth)acrylic acid ester.

The polyhydric alcohol may be such that the chain of an ethylene oxide chain in the molecule is elongated by addition of ethylene oxide.

In addition, it is possible to use an acrylic ester having two or more acryloyl groups in one molecule thereof, the acrylic ester being derived from a polyhydric compound. Examples of the polyhydric compound include: condensates of glycols; oligoethers; and oligoesters.

Examples of other favorable nonionic polymerizable compound include: (meth)acrylates of polyols having two or more hydroxyl groups, such as monosaccharides and disaccharides; and (meth)acrylates of triethanolamine, diethanolamine, trishydroxyaminomethane, or trishydroxyaminoethane.

In addition, as for the nonionic polymerizable compound, a water-soluble polymerizable compounds having a (meth) acrylamide structure in the molecule thereof is also favorable. Of the polymerizable compound having the (meth)acrylamide structure in the molecule thereof, a compound represented by the following Formula (1) is more preferable.

Formula (1)

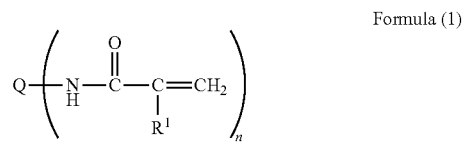

In Formula (1), Q represents an n-valence of linking group; R¹ represents a hydrogen atom or a methyl group; and n represents an integer of 2 or more. The polymerizable compound is a compound having two or more (meth)acrylamide groups in the molecule thereof.

In the compound represented by Formula (1), unsaturated vinyl monomers bind to the linking group Q via an amide bond. R¹ represents a hydrogen atom or a methyl group, and R¹ is preferably a hydrogen atom. From the viewpoints of improving polymerization efficiency and ejection stability, the valence n of the linking group Q is 2 or larger, particularly preferably from 2 to 6, and more preferably from 2 to 4.

In addition, the linking group Q is not specifically restricted as long as it is a group capable of linking with a (meth)acrylamide structure, but is preferably selected from such linking groups that the compound represented by Formula (1) satisfies the degree of water solubility as mentioned above. Specific examples of the linking group include a residue obtained by removing one or more hydrogen atoms or hydroxyl groups from a compound selected from the following compound group X.

—Compound Group X—

Polyols such as ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3,-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentyl glycol, pentaerythritol, dipentaerythritol, condensates thereof, low molecular polyvinyl alcohols, or sugars.

Polyamines such as ethylenediamine, diethylenetriamine, triethylenetetramine, polyethyleneimine, or polypropylenediamine.

Other examples of the linking group Q include substituted or unsubstituted alkylene chains having 4 or less carbon atoms, such as a methylene, ethylene, propylene, or butylene group and functional groups having a saturated or unsaturated hetero ring, such as a pyridine ring, an imidazole ring, a pyrazine ring, a piperidine ring, a piperazine ring, or a morpholine ring.

Among them, the linking group Q is preferably a residue of polyols including an oxyalkylene group (preferably an oxyethylene group), and particularly preferably a residue of polyols including three or more oxyalkylene groups (preferably three or more oxyethylene groups).

Specific examples of the water-soluble polymerizable compounds having an acrylamide structure in the molecule thereof are shown below. However, the present invention is not restricted to them.

Polymerizable Compound 1

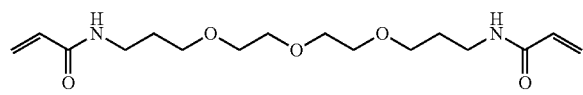

Polymerizable Compound 2

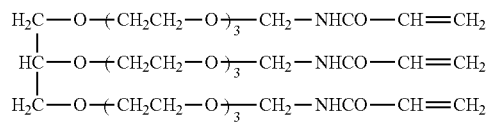

Polymerizable Compound 3

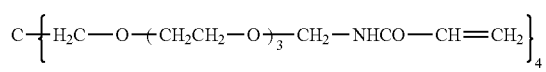

Polymerizable Compound 4

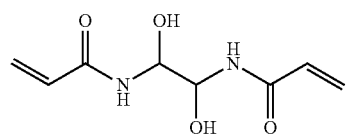

(a)

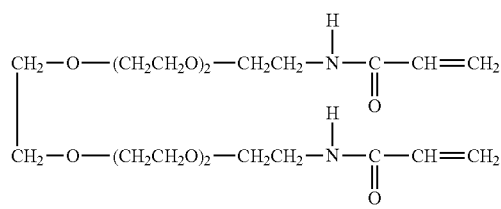

(b)

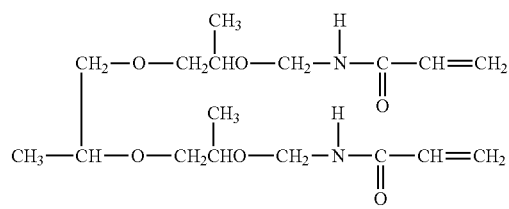

(c)

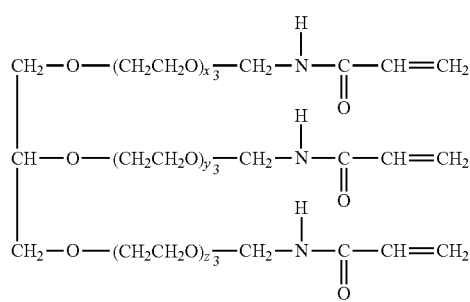

$x_3 + y_3 + z_3 = 6$

-continued
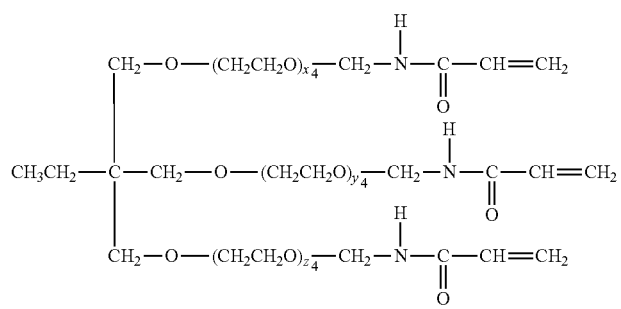
$x_4 + y_4 + z_4 = 9$
(d)
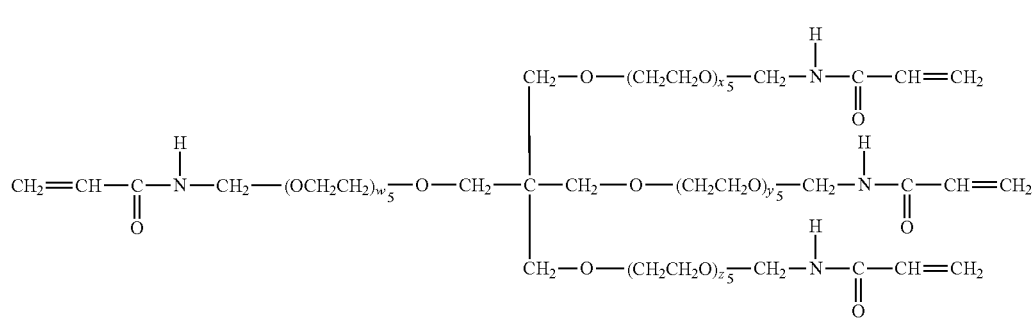
$w_5 + x_5 + y_5 + z_5 = 6$
(e)
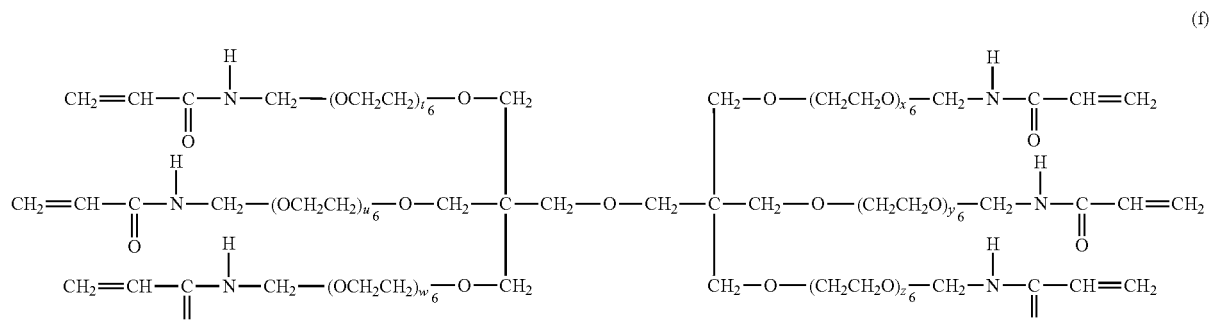
$t_6 + u_6 + w_6 + x_6 + y_6 + z_6 = 12$
(f)
lp;2p
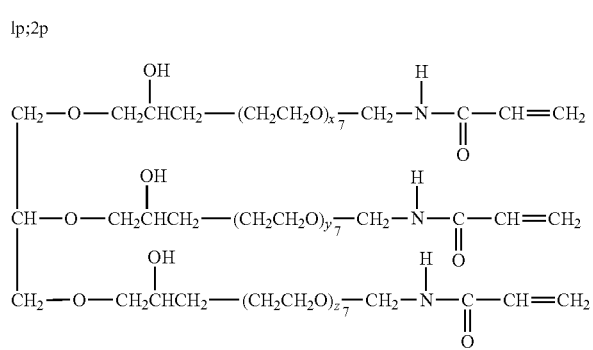
$x_7 + y_7 + z_7 = 3$
(g)

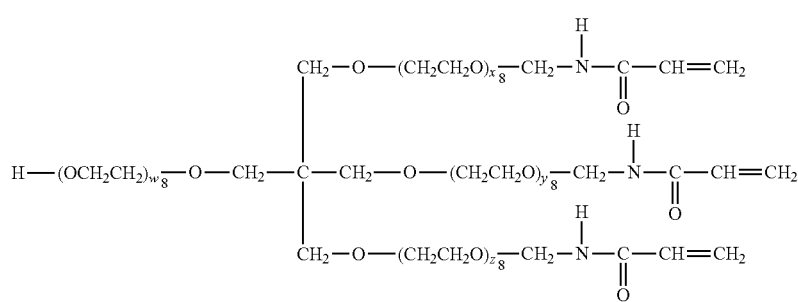

(h)

$w_8 + x_8 + y_8 + z_8 = 6$

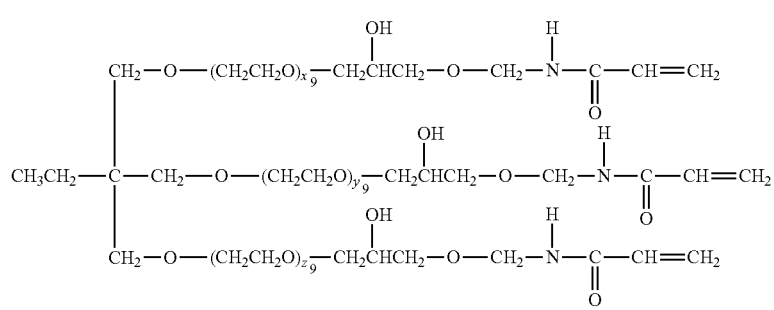

(i)

$x_9 + y_9 + z_9 = 3$

The cationic polymerizable compound is a compound having a cation group, and a polymerizable group such as an unsaturated double bond. For example, epoxy monomers and oxetane monomers may be favorably used. When such a cationic polymerizable compound is contained in an ink composition, cationic properties of the ink composition is increased due to a cationic group thereof, whereby color mixing caused by using anionic ink is more effectively prevented.

Examples of the cationic polymerizable compound include N,N-dimethylaminoethyl methacrylate, N,N-dimethylaminoethyl acrylate, N,N-dimethylaminopropyl methacrylate, N,N-dimethylaminopropyl acrylate, N,N-dimethylamino acrylamide, N,N-dimethylamino methacrylamide, N,N-dimethylaminoethyl acrylamide, N,N-dimethylaminoethyl methacrylamide, N,N-dimethylaminopropyl acrylamide, N,N-dimethylaminopropyl methacrylamide, and quaternized compounds thereof.

Examples of the epoxy monomers include glycidylethers of polyhydric alcohols, glycidylesters, and aliphatic cyclic epoxides.

Furthermore, other examples of the cationic polymerizable compound include those having the following structures.

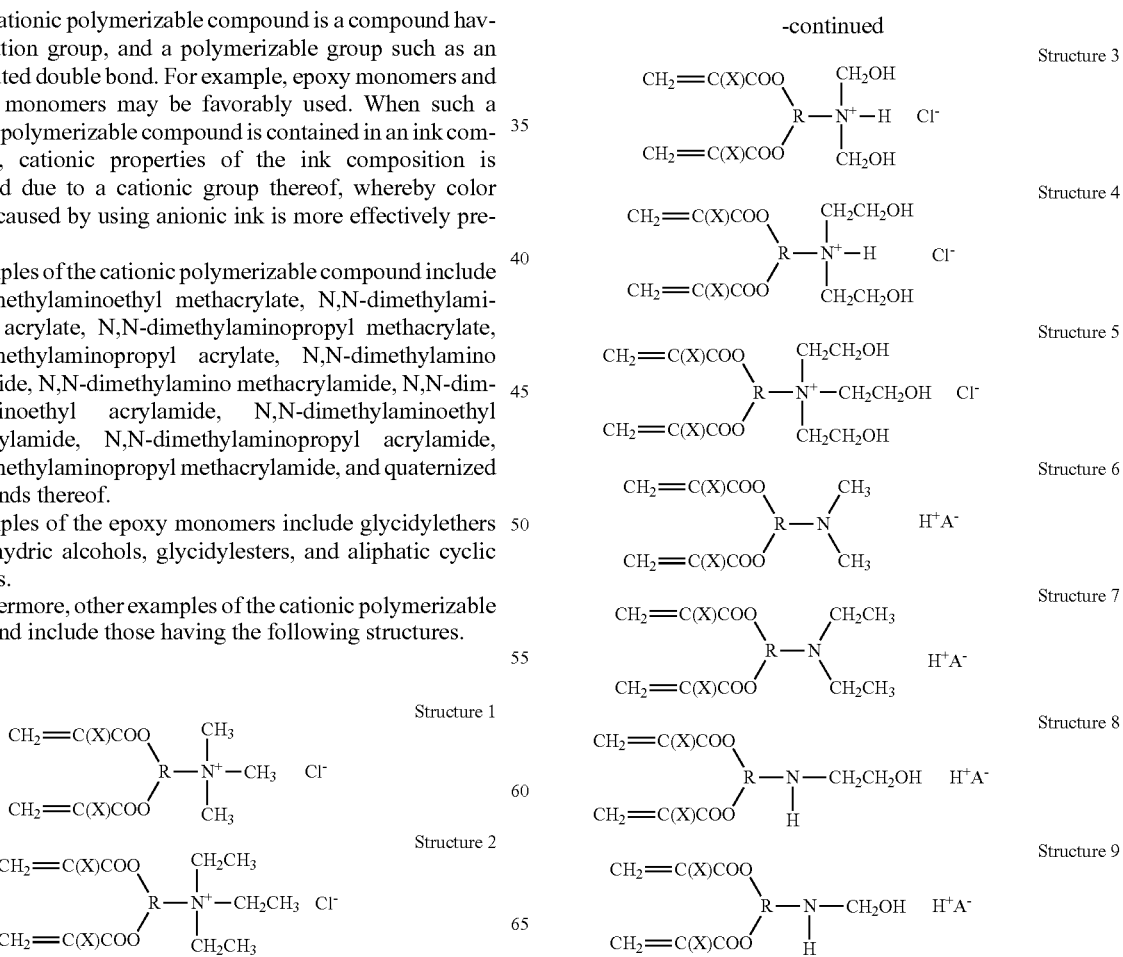

-continued

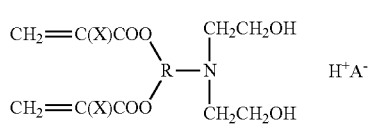
Structure 10

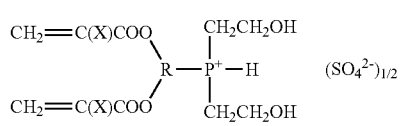
Structure 11

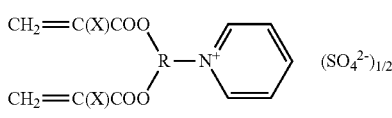
Structure 12

In the above structures, R represents a residue of polyol; X represents H or $CH_3$; and $A^-$ represents $Cl^-$, $HSO_3^-$, or $CH_3COO^-$. Examples of a compound for introducing the polyol include glycerin, 1,2,4-butanetriol, 1,2,5-pentanetriol, 1,2,6-hexanetriol, trimethylolpropane, trimethylolmethane, trimethylolethane, pentaerythritol, bisphenol A, alicyclic bisphenol A, and condensates thereof.

Specific examples (cationic compounds 1 to 11) of the polymerizable compounds having a cationic group are shown below.

Cationic Compound 1

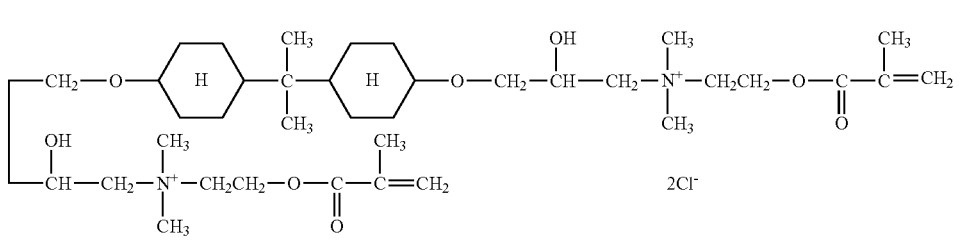

In the above,

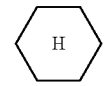

represents a cyclohexane ring.

Cationic Compound 2

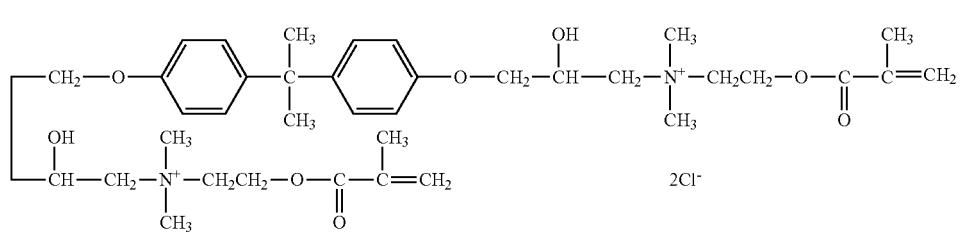

Cationic Compound 3

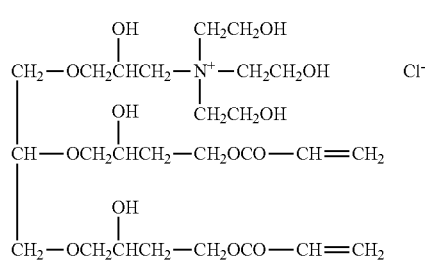

-continued
Cationic Compound 4
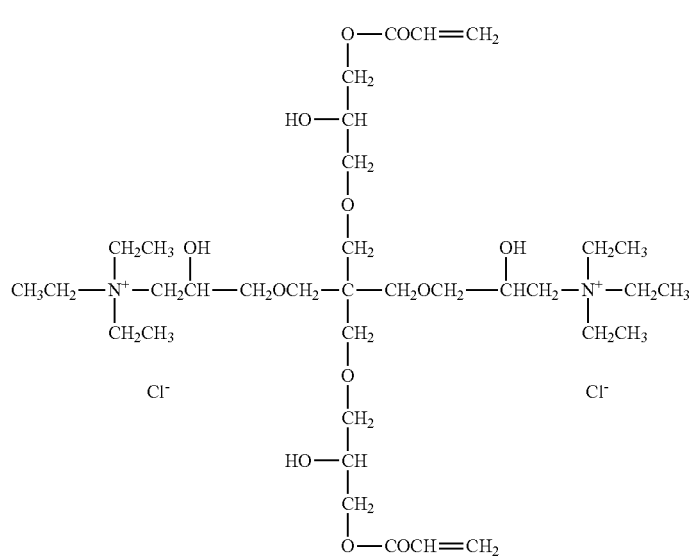
Cationic Compound 5
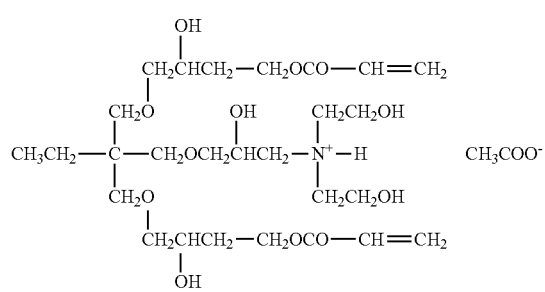
Cationic Compound 6
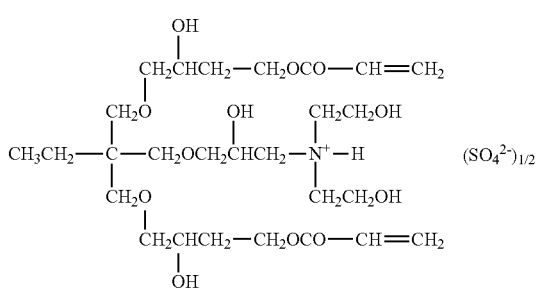
Cationic Compound 7
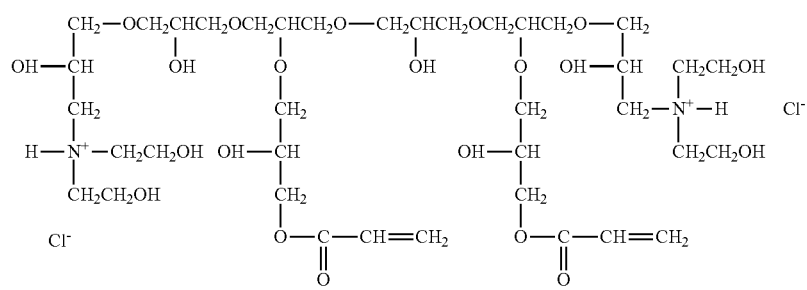
Cationic Compound 8
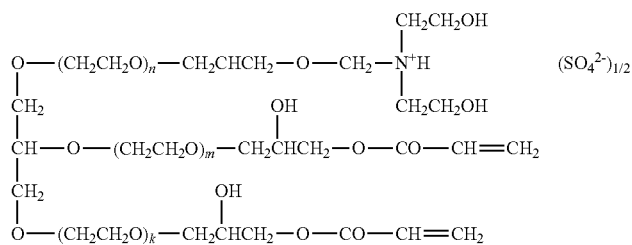
n + m + k = 15

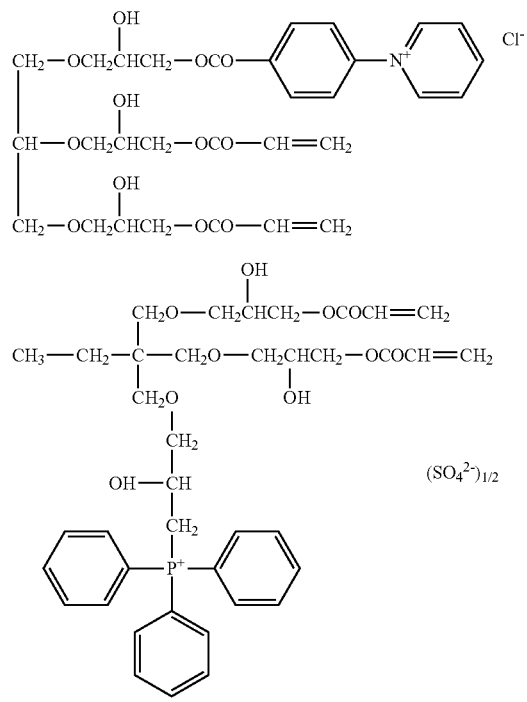

As the polymerizable compound in the present invention, bifunctional to hexafunctional monomers more are preferred from a viewpoint of ability to enhance rubfastness. Meanwhile, from a viewpoint of achieving a balance between solubility and rubfastness, bifunctional to tetrafunctional monomers are particularly preferred.

The polymerizable compound can be contained alone or in combination of two or more thereof.

The content of the polymerizable compound in the ink composition is preferably from 2.5 to 40% by mass, more preferably from 5 to 35% by mass, still more preferably from 5 to 30% by mass, particularly preferably from 5 to 25% by mass, and most preferably from 5 to 20% by mass, with respect to the total mass of the ink composition.

When the amount of the contained polymerizable compound is 2.5% by mass or more, adhesion with a recording medium is improved and also image strength is further increased, thereby improving rub fastness of images. Additionally, the content of the polymerizable compound in the amount of 40% by mass or less has advantage of relief (pile height) of images.

(5) Water

The ink composition of the present invention is formed such that the ink composition has a water-based structure containing water, in which the content of water is 50% by mass or more with respect to the total amount of the ink composition. Even though the content of water is 50% by mass or more, reduction in temporal stability of the ink composition due to precipitation or the like of the polymerization initiator is suppressed by using both the specific compound and the polymerizable compound in combination.

Particularly, the content of water is preferably 50 to 80% by mass, more preferably 50 to 75% by mass, and still more preferably 50 to 70% by mass.

(6) Polymer particle

The ink composition of the present invention may contain at least one type of polymer particles. Upon contact with the treatment liquid described below or a region obtained by drying the same, the polymer particles have a function to cause destabilization of the dispersion, and to fix the ink composition due to the resultant aggregation and thickening of the ink composition, whereby fixability of the ink composition in the recording medium and rubfastness of images are further improved.

The polymer particles can be used, for example, as a latex in which a particulate polymer is dispersed in an aqueous medium. Examples of the polymer include an acrylic resin, a vinyl acetate resin, a styrene-butadiene resin, a vinyl chloride resin, an acryl-styrene resin, a butadiene resin, a styrene resin, a cross-linked acrylic resin, a cross-linked styrene resin, a benzoguanamine resin, a phenol resin, a silicone resin, an epoxy resin, an urethane resin, a paraffin resin, and a fluoro resin. Among them, preferred examples of the polymer include an acrylic resin, an acryl-styrene resin, a styrene resin, a cross-linked acrylic resin, and a cross-linked styrene resin.

Self-dispersible polymer particles are preferable of the polymer particles. The self-dispersible polymer particles are described in detail below as an example of the polymer particles.

The particles of the self-dispersible polymer refer to those of a water-insoluble polymer that can become a dispersed state in an aqueous medium by a functional group (particularly an acidic group or a salt thereof) of the polymer itself when dispersed (particularly when dispersed by a phase inversion emulsification method) in the absence of a surfactant, and that does not contain any free emulsifier.

The self-dispersible polymer particles are preferable from the viewpoints of ejection stability and liquid stability (particularly dispersion stability) of a system containing the pigment.

The scope of the term, "dispersed state", used herein includes an emulsified state (emulsion) in which a water-insoluble polymer in the liquid state is dispersed in an aqueous medium and a state (suspension) in which a water-insoluble polymer in the solid state is dispersed in an aqueous medium.

The water-insoluble polymer used in the present invention is preferably a water-insoluble polymer that can get into a dispersed state in which the water-insoluble polymer is dispersed in the solid state, from the viewpoints of the aggregation speed and the fixability when the water-insoluble polymer is contained in a liquid composition.

Examples of an aqueous dispersion of the self-dispersible polymer, i.e., a method for preparing an emulsified or dispersed self-dispersible polymer, include a phase inversion emulsification method. Examples of the phase inversion emulsification method include a method which includes dissolving or dispersing the self-dispersible polymer in a solvent (e.g., a hydrophilic organic solvent), putting the resultant substance as it is in water without adding a surfactant, stirring and mixing the resultant substance in a state where a salt-producing group (e.g., an acidic group) of the self-dispersible polymer is neutralized, and removing the solvent, thereby obtaining an emulsified or dispersed aqueous dispersion.

The following procedure can be used to determine whether a water-insoluble polymer is a self-dispersing polymer as mentioned herein: 30 g of a water-insoluble polymer is dissolved in 70 g of an organic solvent (such as methyl ethyl ketone) to form a solution, and then the solution is mixed with both a neutralizing agent that can neutralize salt-forming groups of the water-insoluble polymer to a degree of 100% (the neutralizing agent being sodium hydroxide if the salt-forming groups are anionic, or acetic acid if the salt-forming groups are cationic) and 200 g of water, and then the mixture liquid is stirred with a stirrer having a stirring blade at a rotation rate of 200 rpm at 25° C. for 30 minutes, and then the organic solvent is removed from the mixture liquid. If a stable dispersion state of the water-insoluble polymer in the mixture liquid is confirmed by visual observation for at least one week at 25° C. after the removal of the organic solvent, the water-insoluble polymer is considered to be a self-dispersible polymer.

The term "water-insoluble polymer" used herein refers to a polymer that shows an amount of dissolution of 10 g or less when the polymer is dried at 105° C. for 2 hours and then dissolved in 100 g of water at 25° C. The amount of dissolution is preferably 5 g or less, and more preferably 1 g or less. The amount of dissolution mentioned above is a value measured after the polymer is 100% neutralized with either sodium hydroxide or acetic acid depending on the kind of the salt-forming groups of the water-insoluble polymer.

The aqueous medium includes water as a component and, optionally, a hydrophilic organic solvent may be contained therein. In the present invention, the aqueous medium is preferably formed by water and a hydrophilic organic solvent whose amount is 0.2% by mass or less with respect to the amount of the water, and is more preferably formed by water only.

The main chain backbone of the water-insoluble polymer is not particularly limited, and may be, for example, a vinyl polymer or a condensed polymer (such as an epoxy resin, polyester, polyurethane, polyamide, cellulose, polyether, polyurea, polyimide, or polycarbonate). Among them, a vinyl polymer is preferable.

Preferable examples of the vinyl polymer and the monomer or monomers for forming the vinyl polymer include those described in JP-A Nos. 2001-181549 and 2002-88294. A vinyl polymer may be used which has a dissociative group introduced to a terminal of the polymer chain; the dissociative group may be introduced by radical polymerization of a vinyl monomer using a chain transfer agent, polymerization initiator, or iniferter that has the dissociative group (or a substituent that can be converted to the dissociative group), or by ion polymerization using a compound having the dissociative group (or a substituent that can be converted to the dissociative group) as either of an initiator or a terminator.

Preferable examples of the condensed polymer and the monomers for forming the condensed polymer include those described in JP-A No. 2001-247787.

The particles of the self-dispersible polymer preferably include a water-insoluble polymer containing a hydrophilic constituent unit and a constituent unit derived from an aromatic group-containing monomer unit from the viewpoint of self-dispersibility.

The hydrophilic structural unit is not particularly limited as long as it derives from a monomer containing a hydrophilic group. The hydrophilic structural unit may derive from only one type of hydrophilic-group-containing monomer or from two or more types of hydrophilic-group-containing monomer. The hydrophilic group is not particularly limited, and may be a dissociative group or a nonionic hydrophilic group.

In the present invention, the hydrophilic group is preferably a dissociative group, and more preferably an anionic dissociative group, from the viewpoints of enhancing self-dispersibility and providing stability of the formed emulsion or dispersion state. Examples of the dissociative group include a carboxyl group, a phosphoric acid group and a sulfonic acid group. In particular, a carboxyl group is preferable as the dissociative group, from the viewpoint of fixability of an ink composition containing the self-dispersing polymer particles.

The hydrophilic-group-containing monomer in the present invention is preferably a dissociative-group-containing monomer and more preferably a dissociative-group-containing monomer containing both a dissociative group and an ethylenic unsaturated bond, from the viewpoints of self-dispersibility and aggregation property.

Examples of the dissociative-group-containing monomer include an unsaturated carboxylic acid monomer, an unsaturated sulfonic acid monomer, or an unsaturated phosphoric acid monomer Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated sulfonic acid monomer include styrenesulfonic acid, 2-acrylamide-2-methylpropane sulfonic acid, 3-sulfopropyl(meth)acrylate, and bis-(3-sulfopropyl) itaconate.

Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, acrylic type monomers are more preferable, and acrylic acid and methacrylic acid are still more preferable, from the viewpoint of dispersion stability and ejecting stability.

In the present invention, the acid value of the self-dispersible polymer is preferably 150 mgKOH/g or less from the viewpoint of achieving satisfactory aggregation properties when an ink composition contacts a treatment liquid. The acid value is more preferably from 25 mgKOH/g to 100 mgKOH/ g, and still more preferably from 30 mgKOH/g to 70 mgKOH/g. When the acid value of the self-dispersing polymer is 25 mgKOH/g or more, the stability of the self-dispersibility is enhanced.

The self-dispersing polymer particles preferably contains a polymer having a carboxyl group, more preferably contains a polymer having a carboxyl group and an acid value of from 25 mgKOH/g to 150 mgKOH/g, and still more preferably contains a polymer having a carboxyl group and an acid value of from 30 mgKOH/g to 70 mgKOH/g, from the viewpoint of self-dispersibility and aggregation speed at the time of contact with the treatment liquid.

The aromatic-group-containing monomer is not particularly limited as long as the monomer is a compound containing an aromatic group and a polymerizable group. The aromatic group may be a group derived from an aromatic hydrocarbon or from an aromatic heterocycle. In the present invention, the aromatic group is preferably an aromatic group derived from an aromatic hydrocarbon, from the viewpoint of improving the stability of the particle shape in an aqueous medium.

The polymerizable group may be a condensation-polymerizable group or an addition-polymerizable group. The polymerizable group is preferably an addition-polymerizable group, and more preferably a group containing an ethylenic unsaturated bond, from the viewpoint of improving the stability of the particle shape in an aqueous medium.

The aromatic-group-containing monomer is preferably a monomer having an aromatic group derived from an aromatic hydrocarbon and an ethylenic unsaturated bond. The aromatic-group-containing monomer may be used singly or in combination of two or more thereof.

Examples of the aromatic-group-containing monomer include phenoxyethyl(meth)acrylate, benzyl(meth)acrylate, phenyl(meth)acrylate, and a styrene-based monomer. In particular, from the viewpoints of balance between hydrophilicity and hydrophobicity of the polymer chain, and ink fixability, an aromatic-group-containing (meth)acrylate monomer is preferable, and at least one selected from phenoxyethyl (meth)acrylate, benzyl(meth)acrylate, and phenyl(meth) acrylate is more preferable, and phenoxyethyl(meth)acrylate and benzyl(meth)acrylate are still more preferable.

The term "(meth)acrylate" used herein refers to acrylate or methacrylate.

The self-dispersible polymer is preferably an acrylic resin containing a constituent unit derived from a (meth)acrylate monomer and is preferably an acrylic resin containing a constituent unit derived from aromatic group-containing (meth) acrylate monomer. Further, it is preferable that a constituent unit derived from aromatic group-containing (meth)acrylate monomer is contained in the acrylic resin and the content of the aromatic group-containing (meth)acrylate monomer is from 10% by mass to 95% by mass. When the content of the aromatic group-containing (meth)acrylate monomer is from 10% by mass to 95% by mass, the stability of self-emulsification or -dispersion state can be improved, and moreover an increase in the ink viscosity can be suppressed. In the invention, from the viewpoint of the stability of a self-dispersion state, stabilization of the particle shape in an aqueous medium due to hydrophobic interaction between aromatic rings or cycloaliphatic hydrocarbon groups, and a reduction in the amount of water-soluble components due to rendering particles moderately hydrophobic, the content of the aromatic group-containing (meth)acrylate monomer is more preferably from 15% by mass to 90% by mass, still more preferably from 15% by mass to 80% by mass, and particularly preferably from 25% by mass to 70% by mass.

The self-dispersible polymer may be formed of, for example, a structural unit derived from an aromatic-group-containing monomer and a structural unit derived from a dissociative-group-containing monomer. If necessary, the self-dispersing polymer may further include another structural unit as a component.

The monomer for forming another structural unit is not particularly limited as long as the monomer is copolymerizable with the aromatic-group-containing monomer and the dissociative-group-containing monomer. In particular, an alkyl-group-containing monomer is preferable from the viewpoint of flexibility of the polymer skeleton and ease in regulating the glass transition temperature (Tg).

Examples of the alkyl-group-containing monomer include alkyl esters of (meth)acrylic acids (preferably $C_{1-4}$ alkyl esters of (meth)acrylic acids wherein C means a carbon number), for example, alkyl(meth)acrylates (such as methyl (meth)acrylate, ethyl(meth)acrylate, isopropyl(meth)acrylate, n-propyl(meth)acrylate, n-butyl(meth)acrylate, isobutyl (meth)acrylate, t-butyl(meth)acrylate, hexyl(meth)acrylate, and ethylhexyl(meth)acrylate), ethylenic unsaturated monomers each having a hydroxyl group (such as hydroxymethyl (meth)acrylate, 2-hydroxyethyl(meth)acrylate, 2-hydroxypropyl(meth)acrylate, 4-hydroxybutyl(meth)acrylate, hydroxypentyl(meth)acrylate, and hydroxyhexyl(meth)acrylate, and dialkylaminoalkyl(meth)acrylates such as dimethylaminoethyl(meth)acrylate; and (meth)acrylamide monomers such as N-hydroxyalkyl (meth)acrylamides (such as N-hydroxymethyl(meth)acrylamide, N-hydroxyethyl(meth) acrylamide, and N-hydroxybutyl(meth)acrylamide) and N-alkoxyalkyl (meth)acrylamides (such as N-methoxymethyl(meth)acrylamide, N-ethoxydimethyl(meth)acrylamide, N-(n-, iso)butoxymethyl(meth)acrylamide, N-methoxyethyl(meth)acrylamide, N-ethoxyethyl(meth) acrylamide, and N-(n-, iso)butoxyethyl(meth)acrylamide).

The molecular weight of the water-insoluble polymer that forms the self-dispersible polymer particles is preferably from 3,000 to 200,000, more preferably from 5,000 to 150,000, and still more preferably from 10,000 to 100,000, in terms of weight average molecular weight. When the weight average molecular weight is 3,000 or more, the amount of water-soluble component can be effectively set to a small amount. When the weight average molecular weight is 200,000 or less, the stability of the self-dispersibility can be improved.

The weight average molecular weight is measured with a gel permeation chromatography (GPC). As a GPC instrument, HLC-8220GPC manufactured by Tosoh Corporation, is used; the columns (three in number) to be used are TSKgel Super HZM-H, TSKgel Super HZ4000, and TSKgel Super HZ2000 (all manufactured by Tosoh Corporation, 4.6 mmID×15 cm); and THF (tetrahydrofuran) is used as an eluent. In addition, an IR detector is used under the following conditions: sample concentration 0.35% by mass; flow rate 0.35 ml/min; sample injection quantity 10 µl; and measurement temperature 40° C. A calibration curve is formed from eight samples, "standard sample, TSK STANDARD POLYSTYRENE": "F-40", "F-2" "F-4", "F-1", "A-5000", "A-2500", "A-1000", and "N-PROPYLBENZENE", manufactured by Tosoh Corporation.

When the water-insoluble polymer that constitutes the self-dispersing polymer particles contains a structural unit derived from an aromatic-group-containing (meth)acrylate monomer (preferably a structural unit derived from phenoxyethyl (meth)acrylate and/or a structural unit derived from benzyl (meth)acrylate), the copolymerization ratio of the structural unit derived from an aromatic-group-containing (meth)acrylate monomer is preferably from 15 to 80% by mass with respect to the total mass of the self-dispersing polymer particles, from the viewpoint of regulating the hydrophilicity/hydrophobicity of the polymer.

From the viewpoint of regulating hydrophilicity/hydrophobicity of the polymer, the water-insoluble polymer preferably includes: a structural unit derived from an aromatic-group-containing (meth)acrylate monomer wherein a copolymerization ratio of the structural unit is from 15 to 80% by mass; a structural unit derived from a carboxyl-group-containing monomer; and a structural unit derived from an alkyl-group-containing monomer (preferably a structural unit derived from an alkyl(meth)acrylate), and more preferably includes: a structural unit derived from phenoxyethyl(meth) acrylate and/or a structural unit derived from benzyl(meth) acrylate wherein a total copolymerization ratio of the structural unit is from 15 to 80% by mass; a structural unit derived from a carboxyl-group-containing monomer; and a structural unit derived from an alkyl-group-containing monomer (preferably a structural unit derived from (meth)acrylic ester of an alkyl group having 1 to 4 carbon atoms). Further, it is preferable that the acid value of the water-insoluble polymer is from 25 to 100 (mg KOH/g) and the weight average molecular weight of the water-insoluble polymer is from 3,000 to 200,000, and it is more preferable that the acid value is from 25 to 95 (mg KOH/g) and the weight average molecular weight is from 5,000 to 150,000.

Examples of the water-insoluble polymer that constitutes the self-dispersible polymer particles (exemplary compounds B-01 to B-19) are shown below. However, the present invention is not limited thereto. The numbers in the parentheses indicate mass ratios of copolymerization components.

B-01: phenoxyethyl acrylate/methyl methacrylate/acrylic acid copolymer (50/45/5)
B-02: phenoxyethyl acrylate/benzyl methacrylate/isobutyl methacrylate/methacrylic acid copolymer (30/35/29/6)
B-03: phenoxyethyl methacrylate/isobutyl methacrylate/methacrylic acid copolymer (50/44/6)
B-04: phenoxyethyl acrylate/methyl methacrylate/ethyl acrylate/acrylic acid copolymer (30/55/10/5)
B-05: benzyl methacrylate/isobutyl methacrylate/methacrylic acid copolymer (35/59/6)
B-06: styrene/phenoxyethyl acrylate/methyl methacrylate/acrylic acid copolymer (10/50/35/5)
B-07: benzyl acrylate/methyl methacrylate/acrylic acid copolymer (55/40/5)
B-08: phenoxyethyl methacrylate/benzyl acrylate/methacrylic acid copolymer (45/47/8)
B-09: styrene/phenoxyethyl acrylate/butyl methacrylate/acrylic acid copolymer (5/48/40/7)
B-10: benzyl methacrylate/isobutyl methacrylate/cyclohexyl methacrylate/methacrylic acid copolymer (35/30/30/5)
B-11: phenoxyethyl acrylate/methyl methacrylate/butyl acrylate/methacrylic acid copolymer (12/50/30/8)
B-12: benzyl acrylate/isobutyl methacrylate/acrylic acid copolymer (93/2/5)
B-13: styrene/phenoxyethyl methacrylate/butyl acrylate/acrylic acid copolymer (50/5/20/25)
B-14: styrene/butyl acrylate/acrylic acid copolymer (62/35/3)
B-15: methyl methacrylate/phenoxyethyl acrylate/acrylic acid copolymer (45/51/4)
B-16: methyl methacrylate/phenoxyethyl acrylate/acrylic acid copolymer (45/49/6)
B-17: methyl methacrylate/phenoxyethyl acrylate/acrylic acid copolymer (45/48/7)
B-18: methyl methacrylate/phenoxyethyl acrylate/acrylic acid copolymer (45/47/8)
B-19: methyl methacrylate/phenoxyethyl acrylate/acrylic acid copolymer (45/45/10)

The method of producing the water-insoluble polymer that constitutes the self-dispersible polymer particles is not particularly limited. Examples of the method include: a method of performing emulsion polymerization in the presence of a polymerizable surfactant, thereby covalently coupling the surfactant to the water-insoluble polymer; and a method of copolymerizing a monomer mixture containing a hydrophilic-group-containing monomer and an aromatic-group-containing monomer in accordance with a known polymerization process such as a solution polymerization process or a bulk polymerization process. Among the above polymerization processes, from aggregation speed and ejection stability of an ink composition containing the self-dispersible polymer particles, a solution polymerization process is preferable, and a solution polymerization process using an organic solvent is more preferable.

From the viewpoint of aggregation speed, the self-dispersible polymer in the present invention preferably includes a polymer synthesized in an organic solvent, wherein the polymer has carboxyl groups, all or some of the carboxyl groups of the polymer are neutralized (to give an acid value of preferably from 25 to 50), and the polymer is prepared in the form of a polymer dispersion in which water constitutes the continuous phase. In other words, the production of the self-dispersible polymer particles in the present invention preferably includes a step of synthesizing a polymer in an organic solvent and a dispersing step of forming an aqueous dispersion in which at least some of the carboxyl groups of the polymer are neutralized.

The dispersion step preferably includes the following sub-steps (1) and (2):

Sub-step (1): a step of stirring a mixture containing a polymer (water-insoluble polymer), an organic solvent, a neutralizing agent, and an aqueous medium Sub-step (2): a step of removing the organic solvent from the mixture The sub-step (1) is preferably a process in which the polymer (water-insoluble polymer) is dissolved in the organic solvent to form a polymer dispersion, and then the neutralizing agent and the aqueous medium are gradually added to the polymer solution and mixed and stirred to form a dispersion. Thus, when the neutralizing agent and the aqueous medium are added to the water-insoluble polymer solution in which the water-insoluble polymer is dissolved in the organic solvent, self-dispersing polymer particles with diameter exhibiting enhanced storage stability can be obtained without requiring a strong shearing force.

The method of stirring the mixture is not particularly limited, and a generally-used mixing and stirring apparatus and/or, if necessary, a disperser such as an ultrasonic disperser or a high-pressure homogenizer may be used.

Preferable examples of the organic solvent include an alcohol solvent, a ketone solvent, and an ether solvent.

Examples of the alcohol solvent include isopropyl alcohol, n-butanol, t-butanol, and ethanol. Details of these organic solvents are referred to the descriptions in paragraph [0109] of JP-A No. 2011-42150. Among the above solvents, ketone solvents such as methyl ethyl ketone and alcohol solvents such as isopropyl alcohol are preferable. It is also preferable to use isopropyl alcohol and methyl ethyl ketone in combination from the viewpoint of making a polarity change milder at the time of phase inversion from an oil phase to an aqueous phase. The combination of these solvents makes it possible to obtain self-dispersible polymer particles having a very small particle diameter that are free from aggregation precipitation or adhesion between the particles and that have high dispersion stability.

The neutralizing agent is used to neutralize all or some of the dissociative groups of the polymer so as to allow the self-dispersible polymer to get into a stable emulsion or dispersion state in water. When the self-dispersible polymer in the present invention has an anionic dissociative group (e.g., a carboxyl group) as a dissociative group, the neutralizing agent to be used may be a basic compound such as an organic amine compound, ammonia, or an alkali metal hydroxide. Details of the neutralizing agent are referred to the descriptions in paragraph [0110] of JP-A No. 2011-42150. Among them, sodium hydroxide, potassium hydroxide, triethylamine, and triethanolamine are preferable from the viewpoint of dispersion stability in water of the self-dispersible polymer particles.

These basic compounds are preferably used in a ratio of from 5 to 120% by mole with respect to 100% by mole of the dissociative group. Herein, details of the ratio are referred to the descriptions in paragraph [0111] of JP-A No. 2011-42150.

In the sub-step (2), the organic solvent is removed, by distillation, from the dispersion obtained in the sub-step (1) in accordance with a common method such as distillation under reduced pressure, whereby phase inversion into an aqueous system occurs and an aqueous dispersion of the self-dispersible polymer particles is obtained. The organic solvent has substantially been removed from the obtained aqueous dispersion, and the amount of the remaining organic solvent is preferably 0.2% by mass or less, and more preferably 0.1% by mass or less.

The average particle size of the polymer particles is preferably in the range of from 1 nm to 70 nm, more preferably from 2 nm to 60 nm, and still more preferably from 2 nm to 30 nm in terms of volume average particle size. When the volume average particle size is 2 nm or more, the suitability of production is improved. When the volume average particle size is 70 nm or less, local blocking resistance is improved.

The particle size distribution of the self-dispersible polymer particles is not particularly limited, and may be a broad particle size distribution or a mono-dispersed particle size distribution. It is possible to use a mixture of two or more types of water-insoluble particles.

The average particle diameter and particle size distribution of the self-dispersible polymer particles is obtained by measuring the volume average particle diameters of the particles by a dynamic light scattering method using NANOTRAC particle size analyzer UPA-EX150 manufactured by Nikkiso Co., Ltd.

The glass transition temperature (Tg) of the self-dispersible polymer is preferably 70° C. or more, more preferably 80° C. or more, and still more preferably 100° C. or more. When the glass transition temperature (Tg) is 70° C. or more, local blocking resistance is improved. The upper limit of the glass transition temperature (Tg) is not particularly limited.

It is possible to use either one type of polymer particles or a mixture of two or more types of polymer particles.

The content in terms of solid content concentration of the polymer particles in the ink composition is preferably from 1 to 30% by mass, and more preferably from 5 to 15% by mass, with respect to the ink composition, from the viewpoint of aggregation speed, image gloss, and the like.

The content ratio of pigment to polymer particles (for example, water-insoluble pigment particles/self-dispersing polymer particles) is preferably in the range of from 1/0.5 to 1/10, and more preferably in the range of from 1/1 to 1/4, from the viewpoint of, for example, rubfastness of an image.

The above description is given taking the self-dispersible polymer particles as a preferable example of the polymer particles. However, the polymer particles are not limited to the self-dispersible polymer particles and other polymer particles can be used. For example, polymer particles, such as generally known emulsion polymerization latex, can also be favorably used by adjusting the constituent monomer, emulsifier, dispersion conditions, and the like.

(7) Water-Soluble Organic Solvent

The ink composition in the present invention may include a water-soluble organic solvent. The water-soluble organic solvent is effective in preventing dryness of the ink composition and promoting wetting or penetration into paper.

When a water-soluble organic solvent is contained, the content of the organic solvent is preferably small. In the present invention, the content of the water-soluble organic solvent is preferably controlled to a range of less than 3% by mass with respect to the total mass of the ink composition. To control the content of a water-soluble organic solvent to the range of less than 3% by mass implies that the water-soluble organic solvent is not positively contained in the ink composition. Thus, it is preferable for the ink composition of the present invention to include none of water-soluble organic solvent (the content thereof: 0% by mass).

Examples of the water-soluble organic solvent that may be contained in the ink composition include: polyalcohols such as glycols (for example, glycerol, 1,2,6-hexanetriol, trimethylolpropane, ethylene glycol, propylene glycol, diethylene glycol, triethylene glycol tetraethylene glycol, pentamethylene glycol and dipropylene glycol) and alkanediols (for example, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol); and sugars and sugar alcohols, hyaluronic acids, alkyl alcohols having 1 to 4 carbon atoms, glycol ethers, 2-pyrrolidone, N-methyl-2-pyrrolidone described in paragraph [0116] of JP-A No. 2011-42150. These solvents may be selectively used alone or in combination of two or more thereof, when relevant. The polyalcohols are also useful for a dryness-preventing agent and a wetting agent. Examples of the polyalcohols further include those described in paragraph [0117] of JP-A No. 2011-42150. Furthermore, polyol compounds are preferable as a penetrating agent. Examples of aliphatic diols include those described in paragraph [0118] of JP-A No. 2011-42150.

Besides those mentioned above, the water-soluble organic solvent may be a compound represented by the following structural Formula (1):

In the structural Formula (1), each of l, m, and n independently represents an integer of 1 or more and satisfies the equation: l+m+n=3 to 15. Particularly, when l+m+n=3 or more, curling suppression effect can be obtained, and when l+m+n=15 or less, ejectability can be favorably maintained. Especially, a range of from 3 to 12 is preferable, and a range of from 3 to 10 is more preferable. AO represents ethyleneoxy (which may be abbreviated as "EO") and/or propyleneoxy (which may be abbreviated as "PO"). Especially, a propyleneoxy group is preferred. Each AO of $(AO)_l$, $(AO)_m$, and $(AO)_n$ in the structural Formula may be the same as or different from one another.

Details of the compound represented by the structural Formula (1) are described in paragraphs [0121] to [0125] of JP-A No. 2011-42150. As for the alkylene oxide adduct of glycerin, a commercially available product on the market may be used, and examples of polyoxypropylated glycerin (ether of polypropylene glycol and glycerin) include SUNNIX GP250 (average molecular weight: 250), SUNNIX GP400 (average molecular weight: 400), SUNNIX GP600 (average molecular weight: 600), which are manufactured by Sanyo Chemical Industries, Co., Ltd., and examples described in paragraph [0126] of the same patent application publication as mentioned above.

(8) Other Additives

The ink composition used in the present invention may further include other additives than the aforementioned component. Examples of the other additives include known additives such as a polymerization inhibitor, an anti-drying agent (moistener), an anti-fading agent, an emulsion stabilizer, a penetration enhancing agent, a UV absorber, an antiseptic agent, a mildew-proofing agent, a pH adjuster, a surface-tension controller, an antifoam agent, a viscosity adjuster, a dispersion stabilizer, an antirust agent and a chelating agent. When these additives are added to the ink composition, usually they are added directly to the ink composition. When a dispersion of an oily dye is used, usually these additives are added to the dispersion after the preparation of the dye dispersion. However, these additives may be added to an oil phase or aqueous phase during the preparation of the dye dispersion.

<Ink Set>

The ink set according to the present invention includes the ink composition of the present invention described above and a treatment liquid containing an aggregation component that forms an aggregate upon contact with the ink composition. Since the ink set of the present invention uses the ink composition of the present invention, high-precision images with a good rub fastness are formed.

The details of the ink composition are as previously described.

Treatment Liquid

A treatment liquid that constitutes the ink set is described in detail below.

The treatment liquid, when contacts with an ink composition, causes aggregation of dispersing particles such as pigments and polymer particles in the ink composition to immobilize the image on a recording medium. The treatment liquid may contain at least a coagulant that causes aggregation of components in the ink composition and further may contain a polymerization initiator. Further, the treatment liquid may be constituted with other components, if needed. Further, when the treatment liquid is used with the ink composition, inkjet recording can be performed at a higher speed, and an image exhibiting excellent printing properties with high density and high resolution (for example, reproducibility of thin lines and minute portions) is obtained even when recording is performed at high speed.

The coagulant may be a compound that can change the pH value of the ink composition, a polyvalent metal salt, or a polymer having a quaternary or tertiary amine such as a polyallylamine. In the present invention, a compound that can change the pH value of the ink composition is preferable, and a compound that can decrease the pH value of the ink composition is more preferable, from the viewpoint of coagulation properties of the ink composition.

The compound that can decrease the pH value of the ink composition may be an acidic substance. Suitable examples of the acidic substance include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, and derivatives thereof, and salts thereof.

The acid substance may be used singly, or in combination of two or more thereof.

In the present invention, when the treatment liquid includes an acidic substance, the pH value of the treatment liquid at 25° C. is preferably 6 or less, and more preferably 4 or less. In particular, the pH value of the treatment liquid at 25° C. is preferably from 1 to 4, and particularly preferably from 1 to 3. In such a case, the pH value of the ink composition at 25° C. is preferably 7.5 or more, and more preferably 8.0 or more.

In particular, it is preferable that the pH value of the ink composition at 25° C. is 8.0 or more and the pH value of the treatment liquid at 25° C. is from 0.5 to 4, from the viewpoint of image density, resolution, and higher-speed-inkjet recording.

In the present invention, the coagulant is preferably an acidic substance having high solubility in water, and is preferably an organic acid with a view to increasing coagulation properties and immobilizing the entire ink. The coagulant is more preferably a divalent or higher-valent organic acid, and still more preferably a divalent or trivalent acidic substance. The divalent or higher-valent organic acid is preferably an organic acid having a first pKa of 3.5 or less, and more preferably an organic acid having a first pKa of 3.0 or less.

Specifically, favorable examples thereof include phosphoric acid, oxalic acid, malonic acid, and citric acid.

Examples of the polyvalent metal salt include a salt of any of the following: an alkaline earth metal, which belongs to Group 2 of the Periodic Table, such as magnesium or calcium; a transition metal belonging to Group 3 of the Periodic Table, such as lanthanum; a metal belonging to Group 13 of the Periodic Table, such as aluminum; and a lanthanide, such as neodymium. The salt of such a metal is preferably a carboxylic acid salt (such as a formate, acetate, or benzoate), a nitrate, a chloride, or a thiocyanate. In particular, the following salts are preferable: a calcium or magnesium salt of a carboxylic acid (such as formic acid, acetic acid, or benzoic acid); a calcium or magnesium salt of nitric acid; calcium chloride; magnesium chloride; and a calcium or magnesium salt of thiocyanic acid.

The coagulant may be used singly, or in combination of two or more thereof. The content of the coagulant, which causes aggregation of the ink composition, in the treatment liquid is preferably from 1 to 50% by mass, more preferably from 3 to 45% by mass, and still more preferably from 5 to 40% by mass.

The treatment liquid may include at least one polymerization initiator that initiates polymerization of a polymerizable compound in the ink composition by actinic energy ray in addition to incorporation of the polymerization initiator into the ink composition. The polymerization initiator may be used alone, or as a mixture of two or more polymerization initiators, or together with a sensitizer.

The polymerization initiator used in the treatment liquid can be appropriately selected from compounds that can initiate the polymerization reaction of a polymerizable compound by actinic energy ray, in the same manner as the ink composition. Examples of the polymerization initiator include those (such as photopolymerization initiators) generating active species (such as radical, acid, or base) by radiation, light, or electron beam. The details of the photopolymerization initiators and the like are as explained in the above section of the ink composition.

The treatment liquid may include other additives as additional components, as long as the effects of the present invention are not impaired. Examples of other additives include known additives, such as an anti-drying agent (moistening agent), an anti-fading agent, an emulsion stabilizer, a penetration enhancing agent, a UV absorber, an antiseptic agent, an mildew-proofing agent, a pH adjuster, a surface-tension controller, an antifoam agent, a viscosity adjuster, a dispersant, a dispersion stabilizer, an antirust agent, and a chelating agent.

Image Forming Method

An image forming method according to the present invention includes at least an ink applying step for applying the above-described ink composition of the present invention to a recording medium by an inkjet method to form images. Since the ink set of the present invention uses the ink composition of the invention, high-precision images with good rub fastness are formed under the various temperature conditions including low-temperatures.

Ink Applying Step

In the ink applying step, the already-described ink composition of the present invention is applied onto a recording medium by an inkjet method. In this step, the ink composition can be applied selectively onto the recording medium, so that a desired visible image can be formed. Details of the ink composition and details of preferred modes thereof are as explained in the above section of the ink composition.

An image formation using an inkjet method may be performed by jetting a liquid composition onto a desired recording medium by application of energy to form a colored image. As an inkjet recording method that is preferably applicable in the present invention, the method described in paragraphs [0093] to [0105] of JP-A No. 2003-306623 may be used.

The inkjet method is not particularly limited and may be any known method such as a charge-control method in which ink is jetted by electrostatic attraction force; a drop-on-demand method (pressure-pulse method) in which a pressure of oscillation of a piezo element is utilized; an acoustic inkjet method in which ink is jetted by radiation pressure generated by irradiation of ink with acoustic beams that have been converted from electric signals; and a thermal inkjet method in which ink is jetted by a pressure generated by formation of bubbles caused by heating of ink (BUBBLEJET, registered trademark). An inkjet method is described in JP-A No. 54-59936 and can be suitably used; in this method, ink is jetted from a nozzle by an acting force generated by a rapid change in volume of the ink caused by application of a thermal energy to the ink.

Further, examples of the inkjet method include a method in which a large number of small-volume droplets of an ink having a low optical density, which is called a photo ink, are jetted; a method in which inks of substantially the same color hue at different densities are used to improve image quality; and a method in which a clear and colorless ink is used.

Regarding the inkjet recording head, there are (i) a shuttle system in which recording is performed while a short serial head having a small length is moved in the width direction of a recording medium in a scanning manner, and (ii) a line system in which a line head having recording devices that are aligned correspondingly to the entire length of one side of a recording medium is used. In the line system, image recording can be performed over the whole of one surface of a recording medium by moving the recording medium in a direction orthogonal to the direction along which the recording devices are aligned. As a result, a conveyance system, such as carriage which moves a short head in a scanning manner, is unnecessary. Further, since a complicated scan-movement control of the movement of the carriage and the recording medium is unnecessary and only the recording medium is moved, the recording speed can be increased compared to the shuttle system. The inkjet recording method of the present invention can be applied to both of these systems; effects of improving both jetting accuracy and rub fastness of an image are larger when the inkjet recording method of the present invention is applied to a line system, in which dummy jetting is not generally performed.

The amount of ink per one drop jetted from an inkjet head is preferably from 1 pl to 10 pl, and more preferably from 1.5 pl to 6 pl, from the viewpoint of obtaining a high-precision image. It is also effective to jet liquid droplets of different quantities in combination from the viewpoint of suppressing unevenness in an image and improving smoothness in continuous gradation. The present invention is effective also in such an embodiment.

Treatment Liquid Applying Step

Preferably, the image forming method of the present invention further includes a treatment liquid applying step for applying, to the recording medium, a treatment liquid containing a coagulant that forms an aggregate upon contact with the ink composition.

In the treatment liquid applying step, a treatment liquid containing a coagulant that coagulates components in the ink composition is applied to a recording medium, and the treatment liquid is brought into contact with the ink composition, thereby forming an image. In this process, aggregation of dispersed particles in the ink composition, such as the pigment and the polymer particles, are caused, whereby the image is immobilized onto the recording medium. The treatment liquid includes at least a coagulant, and details and preferred modes of the respective components are as already-described.

Application of the treatment liquid can be performed using a known method, such as a coating method, an inkjet method, or an immersion method. The coating method may be a known coating method using a bar coater, an extrusion die coater, an air doctor coater, a blade coater, a rod coater, a knife coater, a squeeze coater, a reverse roll coater, or the like. Details of the inkjet method are as already-described.

The treatment liquid applying step may be performed before or after the ink applying step using the ink composition. In the present invention, it is preferable to perform the ink applying step after the treatment liquid is applied in the treatment-liquid applying step. Specifically, in a preferable embodiment, the treatment liquid for causing aggregation of the pigment and/or the polymer particles in the ink composition is applied on the recording medium prior to applying the ink composition, and then the ink composition is applied so as to contact with the treatment liquid provided on the recording medium, whereby an image is formed. As a result, inkjet recording can be performed at higher speed, and an image having high density and resolution is obtained even when recording is performed at high speed.

The amount of the treatment liquid to be applied is not particularly limited as long as the ink composition can be coagulated, and is preferably 0.1 g/m$^2$ or more in terms of the amount of applied coagulant. The amount of the applied coagulant is more preferably from 0.2 to 0.7 g/m$^2$. When the amount of the applied coagulant is 0.1 g/m$^2$ or more, superior high-speed aggregation properties that accord with various modes of the use of the inkjet composition are maintained. A coagulant application amount of 0.7 g/m² or less is preferable in that disadvantageous influences, such as change in gloss, are not given to the surface properties of the recording medium to which the treatment liquid is applied.

In the present invention, it is preferable that the ink applying step is performed after the treatment liquid applying step, and then a heat-drying step of drying the treatment liquid on the recording medium by heating is performed during a period of after the application of the treatment liquid onto a recording medium and before the application of the ink composition. By drying the treatment liquid by heating prior to the ink applying step, the ink colorability, including suppression of bleeding, are improved, and a visible image having superior color density and hue can be recorded.

The drying by heating may be performed with a known heating means, such as a heater, or a heating means utilizing blowing of air, such as a drier, or a means having a combination thereof. Examples of the heating method include: a method of supplying heat from the side of the recording medium opposite to the surface on which the treatment liquid has been applied, using a heater or the like; a method of blowing a warm or hot air to the surface of the recording medium on which the treatment liquid has been applied; a heating method using an infrared heater; and a combination of two or more of the above methods.

Recording Medium

According to the image-forming method of the present invention, an image is recorded on a recording medium.

The recording medium is not particularly limited, and may be a cellulose-based general printing paper, such as high-quality paper, coat paper, or art paper, which is used for general offset printing and the like. When image recording is performed on the cellulose-based general printing paper by a general inkjet method using an aqueous ink, absorption and drying of the ink is relatively slow, colorant migration easily occurs after ink spotting, and image quality tends to lower. In contrast, according to the image-forming method of the present invention, a high-quality image recording having excellent color density and hue is achieved while suppressing the migration of the colorant.

The recording medium may be a commercially-available product, and examples thereof include high-quality papers (A) such as PRINCE WOOD FREE (trade name) manufactured by Oji Paper Co., Ltd., SHIRAOI (trade name) manufactured by Nippon Paper Industries Co., Ltd., and New NPI JO-SHITSU (New NPI high-quality; trade name) manufactured by Nippon Paper Industries Co., Ltd.; very light-weight coated papers such as EVER LIGHT COATED (trade name) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd. and AURORA COAT (trade name) manufactured by Nippon Paper Industries Co., Ltd.; and art papers (A1) such as 2/SIDE GOLDEN CASK GLOSS (trade name) manufactured by Oji Paper Co., Ltd. and TOKUBISHI ART (trade name) manufactured by Mitsubishi Paper Mills Ltd. As the recording medium, various inkjet-recording papers exclusively for photos may be used.

Among the recording media, coated paper, which is used for general offset printing, is preferable. The coated paper is produced generally by coating a coating material so as to form a coating layer on a surface of cellulose-based paper (such as high-quality paper or neutral paper), which has not been subjected to surface treatment. When image forming is performed by usual water-based inkjet, the coated paper tends to produce problems in quality, in terms of, for example, image gloss or rub fastness. In contrast, according to the image-forming method of the present invention, unevenness in gloss is suppressed and an image having excellent gloss and rub fastness can be obtained according to the image-forming method of the present invention even. In particular, it is preferable to use a coated paper having a base paper and a coated layer including an inorganic pigment, and it is more preferable to use a coated paper having a base paper and a coated layer including kaolin and/or calcium bicarbonate. Specifically, art papers, coat papers, lightweight coat papers, or very light-weight coat papers are preferable.

Inkjet Recording Apparatus

Next, an example of an inkjet recording apparatus favorably used for the image recording method of the present invention will be explained in detail with reference to FIG. 1. FIG. 1 is a schematic view showing an example of a structure of the entire inkjet recording apparatus.

As shown in FIG. 1, the inkjet recording apparatus includes: treatment liquid application unit 12, having treatment liquid jetting head 12S that jets the treatment liquid; treatment liquid drying zone 13, having heating unit (not shown) that dries the applied treatment liquid; and ink jetting unit 14 that jets various ink compositions; and ink drying zone 15 at which the jetted ink composition is dried, in this order in the conveyance direction of the recording medium (the direction of the arrow shown in the FIGURE). Further, UV ray irradiation unit 16, having UV ray irradiation lamp 16S, is provided downstream of ink drying zone 15 in the conveyance direction of the recording medium.

The recording medium, that has been supplied to the inkjet recording apparatus from a case in which the recording mediums are loaded, is conveyed by conveyance rollers from a feed section to treatment liquid application unit 12, then to treatment liquid drying zone 13, then to ink jetting unit 14, then to ink drying zone 15, and then to UV ray irradiation unit 16, and then accumulated in an accumulation section. The conveyance of the recording medium may be the above-described method using conveyance rollers, or a method other than the method using the conveyance rollers, such as a drum conveyance method using a drum-shaped member, a belt conveyance method, or a stage conveyance method using a stage.

Among the plural conveyance rollers provided in the inkjet recording apparatus, at least one roller may be a drive roller to which the force generated by a motor (not shown) is transmitted. By rotating the drive roller at a constant rate using the motor, the recording medium is conveyed in a predetermined direction at a predetermined conveyance amount.

Treatment liquid application unit 12 has treatment liquid jetting head 12S, which is connected to a storage tank in which the treatment liquid is stored. Treatment liquid jetting head 12S jets the treatment liquid from jetting nozzles disposed to face the recording surface of the recording medium so that droplets of the treatment liquid can be applied onto the recording medium. In treatment liquid application unit 12, not only a method of jetting from a nozzle-shaped head, but also a coating method using a coating roller may be used. According to the coating method, the treatment liquid may be readily applied to almost the entire one surface of the recording medium, including an image portion on which ink droplets are to be spotted by ink jetting unit 14 provided at the downstream side. In order to make uniform the thickness of the treatment liquid applied onto the recording medium, an air-knife may be used, or it is possible to use a method of providing a member having an acute angle to give a gap between the member and the recording medium that corresponds to the predetermined amount of treatment liquid.

Treatment liquid drying zone 13 is disposed downstream of treatment liquid application unit 12 in the conveyance direction of the recording medium. Treatment liquid drying zone 13 may include: a known heating means such as a heater; an air blower such as a drier; or a combination thereof. Examples of the heating means include a method of disposing a heat-generating member, such as a heater, at a side of the recording medium opposite to the surface on which a treatment liquid layer is to be formed (for example, in the case where the recording medium is conveyed automatically, the heat-generating member may be positioned downward the conveyance system that conveys the recording medium placed thereon; or by a method of blowing warm or hot air onto the surface of the recording medium on which a treatment liquid layer is to be formed; or by a method of using an infrared heater. Any of these methods may be used singly, or in combination of two or more thereof.

Since the surface temperature of the recording medium may vary depending on the type (material, thickness and the like) of the recording medium and the environmental temperature, it is preferable to form a treatment liquid layer while regulating the surface temperature by using a system including a measurement section that measures the surface temperature of the recording medium and a control section in which the temperature measured by the measurement section is fed back to the heating control unit. The measurement section for measuring the surface temperature of the recording medium is preferably a contact-type or non-contact type thermometer.

The solvent may be removed using, for example, a solvent-removing roller. Alternatively, a method in which excess solvent is removed from the recording medium by an air knife is also applicable.

Ink jetting unit 14 is positioned downstream of treatment liquid drying zone 13 with respect to the conveyance direction of the recording medium. Ink jetting unit 14 includes recording heads (ink jetting heads) 30K, 30C, 30M and 30Y, which are connected to ink reservoirs that store inks of black (K), cyan (C), magenta (M) and yellow (Y), respectively. Each ink reservoir (not shown) stores an ink composition containing a pigment corresponding to each color, resin particles, a water-soluble organic solvent and water, and the ink composition is supplied to each of ink jetting heads 30K, 30C, 30M and 30Y, as necessary, in the time of image recording. Further, as shown in FIG. 1, recording heads 30A and 30B for jetting inks of specific colors may be further provided, which are positioned downstream of ink jetting heads 30K, 30C, 30M and 30Y with respect to the conveyance direction of the recording medium, such that recording heads 30A and 30B jet the inks having specific colors as necessary.

Ink jetting heads 30K, 30C, 30M and 30Y jet inks in a manner such that the inks correspond to the image to be formed, through jetting nozzles that are positioned so as to face the recording surface of the recording medium. In this way, each of color inks is applied to the recording surface of the recording medium, whereby a color image is recorded.

Treatment liquid jetting head 12S and ink jetting heads 30K, 30C, 30M, 30Y, 30A and 30B are each in the form of full-line head in which a number of jetting ports (nozzles) are aligned along the maximum recording width of the image to be recorded on the recording medium. In this form, image recording on a recording medium can be carried out at higher speed compared to serial-type recording in which recording is carried out using a short-length shuttle head that reciprocates in the width direction of the recording medium (in a direction on the plane of the recording medium that is perpendicular to the conveyance direction of the recording medium) in a scanning manner. In the present invention, either of the above serial-type recording method or a recording method capable of recording at relatively high speed, such as a single-path system in which an image is formed by jetting an ink in a single pass manner such that one line is formed in one scanning-movement while moving in the fast scanning direction relative to the recording medium, may be employed. In the image recording method of the present invention, a high-quality image having high reproducibility may be obtained even in the single-path system.

In the FIGURE, treatment liquid jetting head 12S and ink jetting heads 30K, 30C, 30M, 30Y, 30A and 30B have the same structure.

The application amount of the treatment liquid and the application amount of the ink composition are preferably regulated in accordance with the necessity. For example, the amount of the treatment liquid may be changed according to the type of the recording medium, in order to, for example, adjust the properties such as viscoelasticity of the aggregates formed upon mixing of the treatment liquid and the ink composition.

Ink drying zone 15 is positioned downstream of ink jetting unit 14 in the conveyance direction of the recording medium. Ink drying zone 15 may be configured in the same manner as treatment liquid drying zone 13.

UV ray irradiation unit 16 is disposed further downstream of ink drying zone 15 in the conveyance direction of the recording medium, and emits UV rays from UV ray irradiation lamp 16S provided in UV ray irradiation unit 16, thereby curing through polymerization of the monomer components contained in an image after drying of the image. UV ray irradiation lamp 16S is a lamp which is placed opposite to the recording surface of the recording medium, and the entire recording surface is irradiated by the lamp to cure the entire image. The lamp used in UV ray irradiation unit 16 is not limited to UV ray irradiation lamp 16S, but it is also possible to use a halogen lamp, a high-pressure mercury lamp, a laser, a LED, an electron-beam irradiation device, or the like.

The UV ray irradiation unit 16 may be disposed before or after the ink drying zone 15 and may be disposed both before and after the ink drying zone 15.

The inkjet recording apparatus may further include a heating unit at the conveyance path from the feed section to the accumulation section, in order to conduct a heat treatment on the recording medium. For example, by providing a heating unit at a desired position, such as upstream of treatment liquid drying zone 13 or between ink jetting unit 14 and ink drying zone 15, the temperature of the recording medium can be increased to a desired temperature, whereby drying and fixing are performed effectively.

EXAMPLES

In the following, the present invention will be described in further details with reference to the examples. However, the present invention is not limited to these examples as long as the gist of the invention is retained. Moreover, the term "part" refers to "part by mass" unless otherwise noted.

Example 1

Preparation of Aqueous Ink

Preparation of Yellow Ink 1

(1) Preparation of Polymer Dispersant Liquid 1

6 parts of styrene, 11 parts of stearyl methacrylate, 4 parts of styrene macromer AS-6 (trade name, manufactured by Toagosei Co., Ltd.), 5 parts of BLEMMER PP-500 (trade name, manufactured by NOF Corporation), 5 parts of methacrylic acid, 0.05 parts of 2-mercaptoethanol, and 24 parts of methyl ethyl ketone were added into a reaction vessel to prepare a mixed solution.

Separately, 14 parts of styrene, 24 parts of stearyl methacrylate, 9 parts of styrene macromer AS-6 (trade name, manufactured by Toagosei Co., Ltd.), 9 parts of BLEMMER PP-500 (trade name, manufactured by NOF Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) were added into a dripping funnel to prepare a mixed solution.

In a nitrogen atmosphere, the mixed solution in the reaction vessel was heated to 75° C. while stirring, and the mixed solution in the dripping funnel was gradually dripped into the reaction vessel over one hour. Two hours after the completion of the dripping, a solution of 1.2 parts of 2,2'-azobis(2,4-dimethylvaleronitrile) dissolved in 12 parts of methyl ethyl ketone was dripped into the reaction vessel over three hours. The mixed solution was further aged at 75° C. for two hours and then at 80° C. for two hours, thereby obtaining a polymer dispersant solution 1.

The weight average molecular weight of the polymer in the obtained polymer dispersant solution was measured in the following manner. A part of the polymer dispersant solution was isolated by removing the solvent, and the obtained solid content was diluted with tetrahydrofuran to 0.1 mass % to obtain a sample. The sample was subjected to high-speed GPC (gel permeation chromatography) using HLC-8220 GPC (columns: TSKgeL Super HZM-H, TSKgeL Super HZ4000, and TSKgeL Super HZ2000 (manufactured by Tosoh Corporation) connected in series). The weight average molecular weight of the polymer as measured was 25,000 (as a polystyrene-equivalent value), and the acid value of the polymer measured in accordance with the method described in the JIS specification (JIS K 0070:1992) was found to be 99 mgKOH/g.

Preparation of Yellow Dispersion Liquid

Next, 5.0 g (in terms of solid content) of the above-obtained polymer dispersant solution, 10.0 g of a yellow pigment (Pigment Yellow 74), 40.0 g of methyl ethyl ketone, 8.0 g of 1 mol/L (liter) sodium hydroxide, and 82.0 g of ion exchange water were put in a vessel together with 300 g of 0.1 mm zirconia beads, and were dispersed for 6 hours at 1,000 rpm with a disperser Ready Mill (trade name, manufactured by Aimex Co., Ltd.). The resulting dispersion liquid was condensed under reduced pressure using an evaporator until methyl ethyl ketone was sufficiently removed, and the dispersion liquid was further condensed until the concentration of pigment reached 10%. Yellow pigment dispersion liquid Y1 was thus obtained, in which the water-dispersible pigment was dispersed.

The volume average particle diameter (of the secondary particles) of the yellow dispersion liquid Y1 as measured by a dynamic light scattering method using a particle size distribution meter MICROTRAC Version 10.1.2-211 BH (trade name, manufactured by Nikkiso Co., Ltd.) was 77 nm.

(2) Synthesis of Self-dispersible Polymer Fine Particles 360.0 g of methyl ethyl ketone was placed in a 2 L three-necked flask equipped with a stirrer, a thermometer, a reflux condenser, and a nitrogen gas introduction tube, and was heated to 75° C. Thereafter, while the temperature inside the flask was maintained at 75° C., a mixture solution of 180.0 g of phenoxyethyl acrylate, 162.0 g of methyl methacrylate, 18.0 g of acrylic acid, 72 g of methyl ethyl ketone, and 1.44 g of V-601 (trade name, manufactured by Wako Pure Chemical Industries Ltd.) was added dropwise into the flask at a constant rate such that the dropwise addition was completed in 2 hours. After the dropwise addition was completed, a solution of 0.72 g of V-601 in 36.0 g of methyl ethyl ketone was added into the flask, stirred at 75° C. for 2 hours, and a solution of 0.72 g of V-601 in 36.0 g of isopropanol was further added, and the contents of the flask were stirred at 75° C. for 2 hours. Then, the temperature was increased to 85° C., and stirring was continued for another 2 hours. As a result, a resin solution of a copolymer of phenoxyethyl acrylate/methyl methacrylate/acrylic acid (in a ratio of 50/45/5 by mass) was obtained.

The weight average molecular weight (Mw) of the obtained copolymer as measured in a similar manner to the above polymer dispersant 1 was 64,000 (calculated as polystyrene-equivalent value according to gel permeation chromatography (GPC)). The acid value of the copolymer was found to be 38.9 mgKOH/g.

Then, 668.3 g of the obtained resin solution was weighed, and 388.3 g of isopropanol and 145.7 ml of a 1 mol/L NaOH aqueous solution were added to the resin solution, and then the temperature inside the reaction vessel was elevated to 80° C. Thereafter, 720.1 g of distilled water was added dropwise into the reaction vessel at a rate of 20 ml/min so as to form a water dispersion. The contents of the reaction vessel was allowed to stand, under atmospheric pressure, at a reaction vessel inside temperature of 80° C. for 2 hours, and then 85° C. for 2 hours, and then 90° C. for 2 hours. Subsequently, the pressure inside of the reaction vessel was reduced, and the isopropanol, the methyl ethyl ketone, and the distilled water were removed in a total amount of 913.7 g. As a result, a water dispersion of self-dispersible polymer fine particles B-1 having a solid concentration of 28.0% by mass was obtained.

(3) Synthesis of Polymerizable Compound 1

40.0 g (182 mmol) of 4,7,10-trioxa-1,13-tridecanediamine, 37.8 g (450 mmol) of sodium hydrogen carbonate, 100 g of water, 300 g of tetrahydrofuran were added to a 1 L 3-neck flask equipped with a stirrer, and 35.2 g (389 mmol) of acrylic acid chloride was added dropwise in an ice bath over 20 minutes. After the addition, the tetrahydrofuran was removed under reduced pressure from the reaction mixture obtained by stirring at ambient temperature for 5 hours. Then, an aqueous layer was extracted with 200 ml of ethyl acetate acetate four times, the resulting organic layer was dried over magnesium sulfate and filtered, and the solvent was removed under reduced pressure to obtain 35.0 g of a solid as the target polymerizable compound (1) (107 mmol, yield 59%).

Polymerizable Compound 1

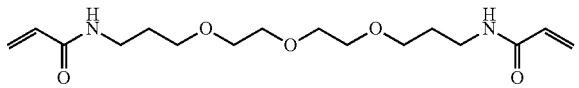

(4) Preparation of Yellow Ink 1

After the yellow dispersion liquid Y1 was prepared as described above, the yellow dispersion liquid Y1 was mixed with the water dispersion of self-dispersible polymer particles, the above-described polymerizable compound 1, an organic solvent, a surfactant, and ion-exchange water, so that an ink having the following composition was prepared. After the preparation of the ink, the ink was filtered through a 5 μm filter so as to remove coarse particles, whereby a yellow ink was obtained.

<Composition of Yellow Ink 1>

| | |
|---|---|
| Yellow dispersion liquid Y1 | 3% by mass (solid concentration in ink: 4% by mass) |
| Water dispersion of self-dispersible polymer particles: | 14.3% by mass ((solid concentration in ink: 4% by mass) |
| Polymerizable compound 1 | 11% by mass |
| Compounds shown in Table 1 below | Amounts shown in Table 1 below (specific compounds selected from the specific group A) |
| OLFINE E1010 (trade name, manufactured by Nissin Chemical Industry Co., Ltd. nonionic surfactant): | 1% by mass |
| Polymerization initiator | Amounts shown in Table 1 below (IRGACURE 2959 (trade name, manufactured by BASF Japan): solubility with respect to pure water (25° C.): 7.6 g/l) |
| Ion-exchange water: | Balance (amount to make 100% by mass in total) |

Preparation of Yellow Inks 2 to 17

Yellow inks 2 to 17 were prepared in the same manner as in Yellow ink 1, except that the specific compound (dimethyl acrylamide) in the preparation of Yellow ink 1 was changed to each of the compounds shown in Table 1 below.

TABLE 1

| Kind of yellow ink | Content of polymerization initiator [% by mass] | Specific compound*1 Kind | Content [% by mass] | Notes |
|---|---|---|---|---|
| 1 | 3 | Dimethylacrylamide | 5.5 | Present invention |
| 2 | 3 | 1-cyclohexyl-2-pyrrolidone | 5.5 | Present invention |
| 3 | 3 | Dimethylacetamide | 5.5 | Present invention |
| 4 | 3 | N-ethylpyrrolidone | 5.5 | Present invention |
| 5 | 3 | N-isopropylacrylamide | 5.5 | Present invention |
| 6 | 3 | Diethylacrylamide | 5.5 | Present invention |
| 7 | 3 | 1-(2-hydroxyethyl)-2-pyrrolidone | 5.5 | Present invention |
| 8 | 3 | 1,3-dimethyl-2-imidazolidinone | 5.5 | Present invention |
| 9 | 3 | Tetramethylurea | 5.5 | Present invention |
| 10 | 3 | Gamma-valerolactone | 5.5 | Present invention |
| 11 | 3.2 | Dimethylacrylamide | 10 | Present invention |
| 12 | 3.5 | Dimethylacrylamide | 15 | Present invention |
| 13 | 3 | GP-250*2 | 5.5 | Comparative Ex. |
| 14 | 3 | Diethylene glycol | 5.5 | Comparative Ex. |
| 15 | 3 | Tripropylene glycol monomethylether | 5.5 | Comparative Ex. |
| 16 | 3 | Hydroxyethyl acrylamide | 5.5 | Comparative Ex. |
| 17 | 3 | 2-pyrrolidone | 5.5 | Comparative Ex. |

*1Specific compound selected from the compound group A.
*2GP-250: SUNNIX GP-250 (hydrophilic organic solvent manufactured by Sanyo Chemical Industries, Co., Ltd.)

Preparation of Treatment Liquid

A treatment liquid was prepared by mixing the ingredients of the following composition. Viscosity, surface tension and pH (25±1° C.) of the treatment liquid when measured in the same manner as described above were as follows: viscosity of 2.5 mPa·s, surface tension of 40 mN/m, and pH of 1.0.

<Composition of treatment liquid>

| | |
|---|---|
| Malonic acid (manufactured by Wako Pure Chemical Industries, Ltd.) | 25% by mass |
| Diethyleneglycol monomethyl ether (manufactured by Wako Pure Chemical Industry Ltd.) | 20.0% by mass |
| EMULGEN P109 (trade name, manufactured by Kao Corp. nonionic surfactant) | 1.0% by mass |
| Ion exchanged water | 54% by mass |

Image Recording and Evaluation

The inks and the aqueous treatment liquids were used, and images were formed as described below. The formed images were evaluated as described below.

(1) Image Formation

First, an inkjet apparatus was prepared which has, as shown in FIG. 1, treatment liquid application unit 12 equipped with treatment liquid jetting head 12S that jets an aqueous treatment liquid, treatment liquid drying zone 13 that dries the applied aqueous treatment liquid, ink jetting unit 14 that jets various aqueous inks, ink drying zone 15 that dries the applied aqueous ink, and UV ray irradiation unit 16 equipped with UV ray irradiation lamp 16S capable of irradiating UV rays are provided sequentially in the conveyance direction of the recording medium (the direction of the arrow shown in the FIGURE).

Although not shown in the FIGURE, treatment liquid drying zone 13 has an air blower at the recording surface side of the recording medium that supplies dry air so as to dry the treatment liquid, and an infrared heater at the non-recording surface of the recording medium. Treatment liquid drying zone 13 is configured such that at least 70% by mass of the water contained in the aqueous treatment liquid is evaporated (dried) off during a period until 900 msec has passed after the application of the treatment liquid is started at the treatment liquid application unit, by regulating the temperature and air volume. In ink jetting unit 14, black-ink jetting head 30K, cyan-ink jetting head 30C, magenta-ink jetting head 30M and yellow-ink jetting head 30Y are disposed in this order in the conveyance direction (the direction of the arrow). Each of the heads is a 1200 dpi/10 inch-wide full-line head having a driving frequency of 25 kHz and a recording medium conveyance velocity of 530 mm/sec. The respective heads are configured to jet inks of respective colors in a single-pass manner while moving in the fast scanning direction relative to the recording medium.

The treatment liquid and yellow ink prepared above were charged into storage tanks (not shown in the FIGURE) respectively connected to treatment liquid jetting head 12S and yellow ink jetting head 30Y of the inkjet apparatus that was configured as shown in FIG. 1, and a solid image and a 1200 dpi line image were formed on a recording medium. The amount of the aqueous treatment liquid applied to the recording medium was set to be 5 ml/m². As the recording medium, URITE (having a basis weight of 84.9 g/m², (trade name, manufactured by Nippon Paper Industries, Co., Ltd.) was used.

In the image formation, the treatment liquid and the cyan ink were jetted at a resolution of 1200 dpi×600 dpi and an ink amount per droplet of 3.5 pl. The line image was recorded by jetting in a single-pass manner so as to form a line of 1200 dpi having a width of 1 dot, a line of 1200 dpi having a width of 2 dots, and a line of 1200 dpi having a width of 4 dots along the fast scanning direction. Regarding the formation of the solid image, a sheet of the recording medium was cut into an A5-size, and a solid image was formed by jetting the ink onto the entire surface of the sample.

When the images were recorded, the treatment liquid was jetted from treatment liquid jetting head 12S onto one surface of the recording medium in a single-pass manner, and then the treatment liquid was dried in treatment liquid drying zone 13. In order to perform the drying, conveyance of the recording medium was controlled so as to pass through the treatment liquid drying zone within 900 m sec after the initiation of the jetting of the aqueous treatment liquid. In treatment liquid drying zone 13, while the spotted aqueous treatment liquid was heated with an infrared heater from the side (back side) of the recording medium that was opposite to the surface at which the treatment liquid was spotted such that a film surface temperature was maintained at 40 to 45° C., hot air having a temperature of 120° C. was blown from a blower to the recording surface, and the air volume was changed to achieve a desired drying amount. Subsequently, the yellow ink was jetted from yellow ink jetting head 30Y in a single pass manner to form an image. In this time, the yellow ink was used in series such that each of the already-prepared Yellow inks 1 to 17 was stored at 5° C. for 14 days before use thereof. Then, in a manner similar to the above, drying of the ink was performed in ink drying zone 15 by blowing a hot air having a temperature of 120° C. and a velocity of 5 m/sec from a blower to the recording surface for 15 seconds while heating with an infrared heater from the side (back side) of the recording medium that was opposite to the surface at which the ink was spotted. After the drying of the image, the image was irradiated with UV rays in UV ray irradiation unit 16, so that the integrating irradiation amount of the UV rays was 3 J/cm2, whereby the image was cured. Herein, irradiation was performed at the maximum irradiation wavelength of 365 nm using a metal halide lamp manufactured by EYE GRAPHICS CO., LTD.

As described above, 17 types of images were formed.

(2) Evaluation

Regarding yellow images obtained above, the following evaluation was performed. The evaluation results are shown in Table 2 below.

A. Temporal Stability at Low Temperature

Each of Yellow inks 1 to 17 was stored at 5° C. for 14 days, followed by visual confirmation as to the presence or absence of precipitation of the polymerization initiator in the ink to evaluate temporal stability of each ink at the low temperature according to the following evaluation criteria.

Evaluation Criteria

A: No precipitate is observed.
B: A small amount of floating matter, supposedly a precipitate, is observed.
C: A precipitate is produced.

B. Rub Fastness

An A5 size sample having a solid image formed on an entire surface of the recording medium as described above was left for 72 hours under the conditions of 25° C. and 50% RH. An unrecorded URITE (hereinafter, referred to as "an unused sample" in this evaluation) was placed on the surface of the solid image left as described above, and repeatedly rubbed 10 times under a load of 200 kg/m² over the entire surface of the solid image. Then, the unused sample and the solid image were visually observed, and rubfastness thereof was evaluated in accordance with the following evaluation criteria. The evaluation results are shown in the following Table 2.

Evaluation Criteria

A: A color attached to the unused sample is not observed and deterioration of the rubbed solid image is not found.
B: A color attached to the unused sample is observed, but deterioration of the rubbed solid image is not found.
C: A color attached to the unused sample is observed and deterioration of the rubbed solid image is found.
D: The rubbed solid image is dropped off and resultantly the paper ground (URITE) is exposed.

TABLE 2

| Kind of yellow ink | Evaluation results | | Notes |
| | Temporal stability at low temperature | Rub fastness | |
|---|---|---|---|
| 1 | A | A | Present invention |
| 2 | A | A | Present invention |
| 3 | A | A | Present invention |
| 4 | A | A | Present invention |
| 5 | A | A | Present invention |
| 6 | B | B | Present invention |
| 7 | B | B | Present invention |
| 8 | B | B | Present invention |
| 9 | B | B | Present invention |
| 10 | B | B | Present invention |
| 11 | A | A | Present invention |
| 12 | A | A | Present invention |
| 13 | C | C | Comparative Ex. |
| 14 | C | C | Comparative Ex. |
| 15 | C | C | Comparative Ex. |
| 16 | C | C | Comparative Ex. |
| 17 | C | C | Comparative Ex. |

As shown in Table 2, in the inks of the present invention, precipitation was suppressed even when the inks were maintained at the low temperature condition for a long hour. These results show that the inks of the present invention exhibit stable storage capability. In addition, image strength was so high that excellent rub fastness was achieved in the present invention.

In contrast, the comparative systems using no specific compounds exhibited both poor ink stability at the low temperature condition and poor rub fastness of the formed image.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising:
   a pigment;
   a polymerization initiator having a content of 2% by mass or more with respect to a total amount of the composition and having a solubility with respect to pure water at 25° C. of from 5 to 8 g/l;
   a compound A that is at least one selected from the group consisting of dimethylacrylamide, diethylacrylamide, N-isopropylacrylamide, dimethylacetamide, N-ethylpyrrolidone, 1-cyclohexyl-2-pyrrolidone, 1-(2-hydroxyethyl)-2-pyrrolidone, 1,3-dimethyl-2-imidazolidinone, tetramethylurea and gamma-valerolactone;
   a polymerizable compound having two or more ethylenically unsaturated double bonds; and
   water having a content of 50% by mass or more with respect to the total amount of the composition.

2. The ink composition according to claim 1, wherein the polymerizable compound comprises a compound having two or more (meth)acrylamide groups.

3. The ink composition according to claim 1, wherein compound A is at least one selected from the group consisting of dimethylacrylamide, N-isopropylacrylamide, dimethylacetamide, N-ethylpyrrolidone and 1-cyclohexyl-2-pyrrolidone.

4. The ink composition according to claim 1, wherein the polymerizable compound is represented by the following Formula (1):

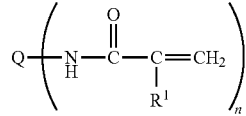

Formula (1)

wherein, in Formula (1), Q represents a linking group having a valence of n; $R^1$ represents a hydrogen atom or a methyl group; and n represents an integer of 2 or more.

5. The ink composition according to claim 1, wherein the content of compound A is from 0.5 to 40% by mass with respect to the total amount of the composition.

6. The ink composition according to claim 1, wherein the pigment comprises a water-dispersible pigment whose surface is at least partially coated with a polymeric dispersant.

7. The ink composition according to claim 1, wherein the pigment comprises a water-dispersible pigment whose surface is at least partially coated with a polymeric dispersant having a carboxyl group.

8. The ink composition according to claim 1, wherein compound A is at least one selected from the group consisting of dimethylacrylamide, N-isopropylacrylamide, dimethylacetamide, N-ethylpyrrolidone and 1-cyclohexyl-2-pyrrolidone; and the polymerizable compound comprises a compound having two or more (meth)acrylamide groups.

9. The ink composition according to claim 1, wherein compound A is at least one selected from the group consisting of dimethylacrylamide, N-isopropylacrylamide, dimethylacetamide, N-ethylpyrrolidone and 1-cyclohexyl-2-pyrrolidone; and the polymerizable compound is represented by the following Formula (1):

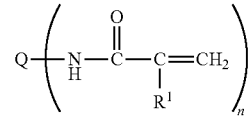

Formula (1)

wherein, in Formula (1), Q represents a linking group having a valence of n; $R^1$ represents a hydrogen atom or a methyl group; and n represents an integer of 2 or more.

10. The ink composition according to claim 1, wherein the pigment comprises an azo pigment.

11. The ink composition according to claim 1, wherein the content of compound A is from 5 to 20% by mass with respect to the total amount of the composition.

12. The ink composition according to claim 1, wherein the polymerization initiator has a content of from 2% by mass to 4% by mass with respect to the total amount of the composition.

13. The ink composition according to claim 1, wherein the polymerization initiator has a content of from 2% by mass to 4% by mass with respect to the total amount of the composition; compound A is at least one selected from the group consisting of dimethylacrylamide, N-isopropylacrylamide, dimethylacetamide, N-ethylpyrrolidone and 1-cyclohexyl-2-pyrrolidone; and the polymerizable compound comprises a compound having two or more (meth)acrylamide groups.

14. The ink composition according to claim 1, wherein the polymerization initiator has a content of from 2% by mass to 4% by mass with respect to the total amount of the composition; compound A is at least one selected from the group consisting of dimethylacrylamide, N-isopropylacrylamide, dimethylacetamide, N-ethylpyrrolidone and 1-cyclohexyl-2-pyrrolidone; and the polymerizable compound is represented by the following Formula (1):

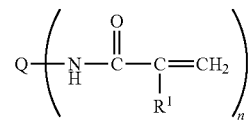

Formula (1)

wherein, in Formula (1), Q represents a linking group having a valence of n; $R^1$ represents a hydrogen atom or a methyl group; and n represents an integer of 2 or more.

15. The ink composition according to claim 1, wherein the polymerization initiator comprises a hydroxyalkylphenone-based initiator.

16. The ink composition according to claim 4, wherein, in Formula (1), Q represents a polyol residue including three or more oxyalkylene groups, and n represents an integer from 2 to 6.

17. The ink composition according to claim 9, wherein, in Formula (1), Q represents a polyol residue including three or more oxyalkylene groups, and n represents an integer from 2 to 6.

18. An ink set comprising the ink composition according to claim 1 and a treatment liquid comprising an aggregation component that forms an aggregate when in contact with the ink composition.

19. An image forming method comprising:
applying the ink composition according to claim 1, to a recording medium by ink jetting, to form an image.

20. The image forming method according to claim 19, further comprising:
applying, to the recoding medium, a treatment liquid comprising an aggregation component that forms an aggregate when in contact with the ink composition.

* * * * *